(12) United States Patent
Phoutchanthavongsa et al.

(10) Patent No.: US 11,288,082 B1
(45) Date of Patent: Mar. 29, 2022

(54) OBJECT PAGE CONFIGURATION INTERFACE OF AN ASSET MANAGEMENT SYSTEM

(71) Applicants: Atlassian PTY Ltd., Sydney (AU); Atlassian Inc., San Francisco, CA (US)

(72) Inventors: Nithaya Phoutchanthavongsa, Sydney (AU); Phillip Allard, Laval (CA); Jean-Christophe Huet, Montreal (CA)

(73) Assignees: Atlassian Pty Ltd., Sydney (AU); Atlassian Inc., San Francisco, CA (US)

( * ) Notice: Subject to any disclaimer, the term of this patent is extended or adjusted under 35 U.S.C. 154(b) by 0 days.

(21) Appl. No.: 17/177,462

(22) Filed: Feb. 17, 2021

(51) Int. Cl.
  *G06F 9/451* (2018.01)
  *G06F 3/0483* (2013.01)
  *G06F 3/0484* (2013.01)
  *G06F 3/04842* (2022.01)

(52) U.S. Cl.
  CPC ............ *G06F 9/451* (2018.02); *G06F 3/0483* (2013.01); *G06F 3/04842* (2013.01)

(58) Field of Classification Search
  CPC ..... G06F 3/0483; G06F 3/04842; G06F 9/451
  See application file for complete search history.

(56) References Cited

U.S. PATENT DOCUMENTS

| | | | | |
|---|---|---|---|---|
| 5,860,073 | A * | 1/1999 | Ferrel | G06F 40/117 715/255 |
| 6,826,727 | B1 * | 11/2004 | Mohr | G06F 40/103 715/235 |
| 8,091,036 | B1 * | 1/2012 | Pavek | G06F 8/38 715/762 |
| 2003/0058277 | A1 * | 3/2003 | Bowman-Amuah | G06F 16/289 715/765 |
| 2004/0015367 | A1 * | 1/2004 | Nicastro | G06Q 10/10 705/300 |
| 2006/0015818 | A1 | 1/2006 | Chaudhri et al. | |
| 2006/0150092 | A1 * | 7/2006 | Atkins | G06T 11/60 715/251 |
| 2006/0200779 | A1 * | 9/2006 | Taylor | G09G 5/14 715/781 |
| 2007/0101279 | A1 | 5/2007 | Chaudhri et al. | |
| 2007/0101288 | A1 | 5/2007 | Forstall et al. | |
| 2007/0118813 | A1 | 5/2007 | Forstall et al. | |
| 2007/0130541 | A1 | 6/2007 | Louch et al. | |

(Continued)

*Primary Examiner* — Eric J. Bycer
(74) *Attorney, Agent, or Firm* — Alston & Bird LLP

(57) ABSTRACT

Methods, apparatuses, systems, and computer program products are disclosed for managing an object page configuration interface in an asset management system. An example embodiment is directed to an improved apparatus that is configured to receive an object page configuration request comprising a first user identifier associated with a first user, cause rendering of an object page configuration interface to a visual display, wherein the object page configuration interface comprises a horizontal widget selection interface and a vertical widget selection interface, receive one or more widget selection requests in response to user interaction with the respective widget selection interfaces, generate an object page interface, the object page interface template comprising at least one horizontal widget content interface component and at least one vertical widget content interface component, and cause storage of the generated object page interface template in association with the first user identifier.

23 Claims, 17 Drawing Sheets

(56) References Cited

U.S. PATENT DOCUMENTS

| | | | |
|---|---|---|---|
| 2008/0034309 A1 | 2/2008 | Louch et al. | |
| 2008/0034314 A1 | 2/2008 | Louch et al. | |
| 2008/0055273 A1 | 3/2008 | Forstall | |
| 2008/0133486 A1* | 6/2008 | Fitzgerald | G06F 21/6218 |
| 2008/0205742 A1* | 8/2008 | Lund | G06K 9/6255 |
| | | | 382/141 |
| 2008/0256439 A1* | 10/2008 | Boreham | G06F 40/103 |
| | | | 715/246 |
| 2008/0263514 A1 | 10/2008 | DeMesa et al. | |
| 2008/0276182 A1* | 11/2008 | Leow | H04M 1/72427 |
| | | | 715/740 |
| 2009/0106656 A1* | 4/2009 | Handy | G06F 16/906 |
| | | | 715/709 |
| 2009/0113322 A1* | 4/2009 | Rogers | G06F 8/34 |
| | | | 715/764 |
| 2010/0077325 A1* | 3/2010 | Barnea | G06F 9/451 |
| | | | 715/763 |
| 2011/0016423 A1* | 1/2011 | Brubaker | G06F 3/0481 |
| | | | 715/800 |
| 2011/0289439 A1* | 11/2011 | Jugel | G06F 8/34 |
| | | | 715/771 |
| 2012/0084674 A1* | 4/2012 | Visosky | G06F 1/16 |
| | | | 715/761 |
| 2012/0102498 A1* | 4/2012 | Subramanya | G06Q 10/109 |
| | | | 718/104 |
| 2014/0310582 A1* | 10/2014 | Bardman | G16H 10/20 |
| | | | 715/222 |
| 2017/0102927 A1* | 4/2017 | Gunther, Jr | G06F 3/0482 |
| 2017/0277407 A1* | 9/2017 | Siravuri | G06Q 20/123 |
| 2017/0371849 A1* | 12/2017 | Levi | G06F 9/4413 |
| 2019/0114063 A1* | 4/2019 | Geva | G06F 3/04847 |
| 2019/0121623 A1* | 4/2019 | Stephan | G06F 9/448 |
| 2019/0342185 A1 | 11/2019 | Barmentloo et al. | |
| 2020/0372206 A1* | 11/2020 | Fialkow | G06F 8/34 |
| 2021/0034225 A1* | 2/2021 | Harazi | G06F 3/04847 |

* cited by examiner

Panel content  IQL query  >

⚠ Changing the content will reset the configuration below

🗑 Remove tab

⚙ Settings

Number of items per page*
25

◯ Load content only when visible

Description
This is a list for...

IQL query
◯ Name LIKE "John Smith"

All attribute values from the object are accessible via placeholders

Attributes to display
Add at the start of the list...  >  Clear all

◉ Only the label of the objects will be displayed.

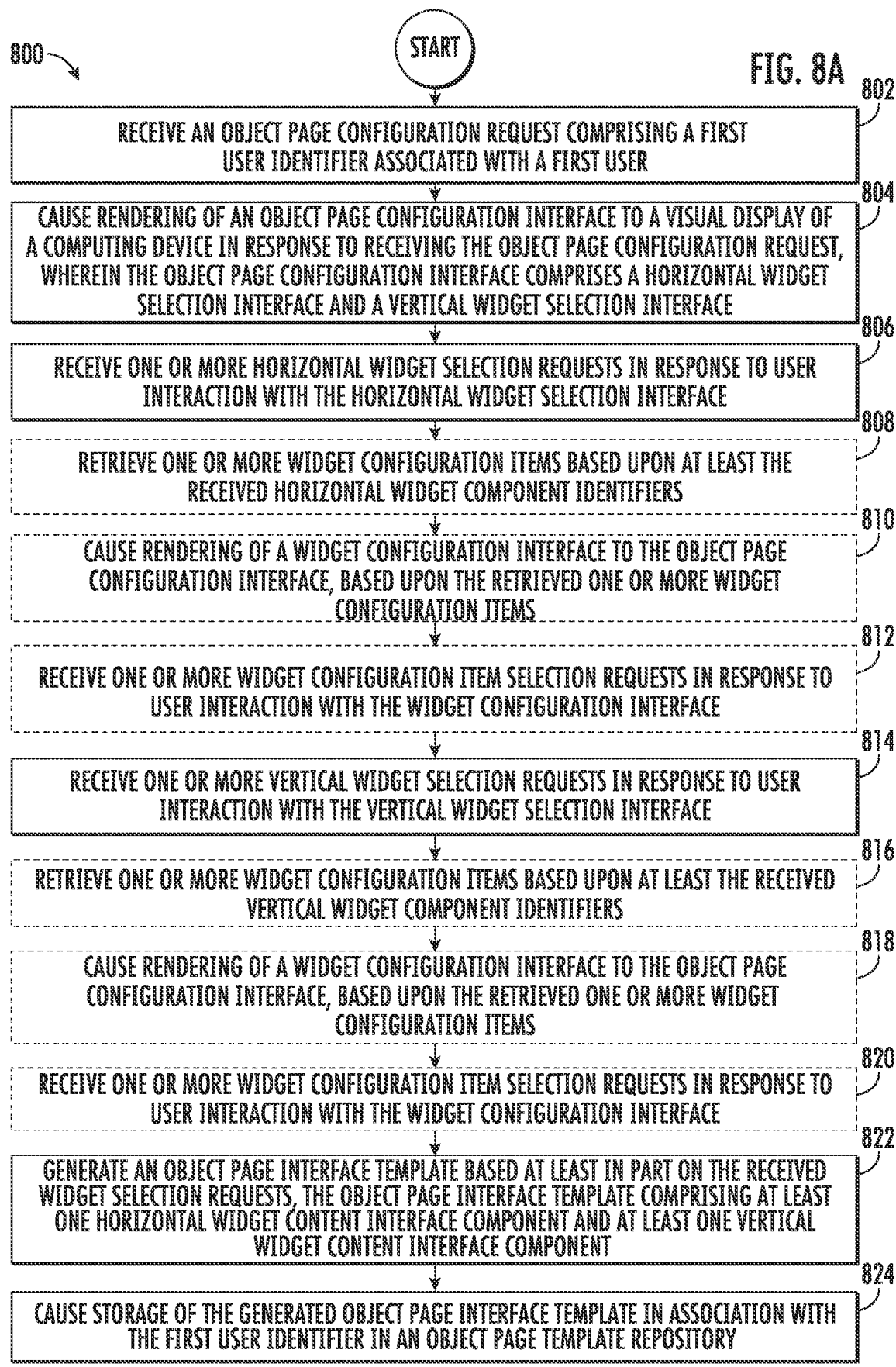

OBJECT PAGE CONFIGURATION INTERFACE OF AN ASSET MANAGEMENT SYSTEM

BACKGROUND

Various asset management systems are available that allow an organization or enterprise to gain visibility into and manage assets, objects, and resources. Such asset management systems may typically provide access to information regarding such assets, objects, and resources. Access to the asset management system and such information is typically provided to multiple users, such users having a myriad of roles, objectives, and responsibilities, and therefore, a variety of preferences, needs, and requirements of the asset management system. Applicant has identified a number of deficiencies and problems associated with accessing assets, objects, and resources in conventional asset management systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatus, systems, and computer program products for facilitating an object page configuration interface of an asset management system.

In some example embodiments, an apparatus is configured to manage an object page configuration interface of an asset management system, the apparatus comprising at least one processor and at least one memory, the at least one memory having computer-coded instructions therein, wherein the computer-coded instructions are configured to, in execution with the at least one processor, cause the apparatus to receive an object page configuration request comprising a first user identifier associated with a first user; cause rendering of an object page configuration interface to a visual display of a computing device in response to receiving the object page configuration request, wherein the object page configuration interface comprises a horizontal widget selection interface and a vertical widget selection interface; receive one or more horizontal widget selection requests in response to user interaction with the horizontal widget selection interface; receive one or more vertical widget selection requests in response to user interaction with the vertical widget selection interface; generate an object page interface template based at least in part on the received widget selection requests, the object page interface template comprising at least one horizontal widget content interface component and at least one vertical widget content interface component; and cause storage of the generated object page interface template in association with the first user identifier in an object page template repository.

In still further embodiments, the object page template repository comprises a plurality of user-generated object page interface templates, each of the user-generated object page interface templates associated with a user identifier.

In some embodiments, each of the received widget selection requests comprises a widget component identifier. In some embodiments, each of the widget component identifiers corresponds to an attributes widget component, a connected tickets widget component, a comments widget component, an attachments widget component, a references widget component, an object history widget component, or a query widget component. In still further embodiments, the computer-coded instructions are further configured to cause the apparatus to retrieve one or more widget configuration items based upon at least the received widget component identifiers; cause rendering of a widget configuration interface to the object page configuration interface based upon the retrieved one or more widget configuration items; receive one or more widget configuration item selection requests in response to user interaction with the widget configuration interface; and generate the object page interface template based at least upon the received widget selection requests and the received widget configuration item selection requests.

In still further embodiments, the object page configuration request comprises the first user identifier and an object type and the computer-coded instructions are further configured to cause the apparatus to retrieve widget configuration items based upon at least the received widget component identifiers and the object type.

In some embodiments, each of the one or more horizontal widget selection requests comprises a horizontal orientation identifier and each of the one or more vertical widget selection requests comprises a vertical orientation identifier. In still further embodiments, the computer-coded instructions are further configured to cause the apparatus to retrieve widget configuration items based upon at least the received widget component identifiers and the respective orientation identifiers. In some embodiments, the computer-coded instructions are further configured to cause the apparatus to retrieve widget configuration items based upon at least the received widget component identifiers and a user role associated with the first user identifier.

In some embodiments, the computer-coded instructions are further configured to cause the apparatus to receive an object page display request comprising the first user identifier and an object identifier; retrieve the generated object page interface template associated with the first user identifier from the object page template repository; retrieve a subset of object data associated with the object identifier and the generated object page interface template from an object data repository; dynamically instantiate the generated object page interface template with the retrieved subset of object data by programmatically mapping the subset of object data to one or more particular widget fields in the generated object page interface template; and cause rendering of the dynamic instantiation of the generated object page configuration interface template to an object page interface on the visual display of the computing device.

In still further embodiments, the object page configuration interface comprises the horizontal widget selection interface, the vertical widget selection interface, and an object type selection interface and the computer-coded instructions are further configured to cause the apparatus to receive an object type selection request in response to user interaction with the object type selection interface, the object type selection request comprising an object type identifier; and cause storage of the generated object page interface template in association with the first user identifier and the object type identifier in the object page template repository.

In some embodiments, the object page configuration request comprises a first user identifier associated with a first user and object type identifier and the computer-coded instructions are further configured to cause the apparatus to cause storage of the generated object page interface template in association with the first user identifier and the object type identifier in the object page template repository. In some embodiments, the object type identifier corresponds to a hardware type, a software type, a server type, a license type, an accessory type, or a network type. In still further embodiments, the object type identifier corresponds to a host type or a client device type. In still further embodiments, the object type identifier corresponds to an employee type.

In another example embodiment, a method for managing an object page configuration interface of an asset management system comprises receiving an object page configuration request comprising a first user identifier associated with a first user; rendering an object page configuration interface to a visual display of a computing device in response to receiving the object page configuration request, wherein the object page configuration interface comprises a horizontal widget selection interface and a vertical widget selection interface; receiving one or more horizontal widget selection requests in response to user interaction with the horizontal widget selection interface; receiving one or more vertical widget selection requests in response to user interaction with the vertical widget selection interface; generating an object page interface template based at least in part on the received widget selection requests, the object page interface template comprising at least one horizontal widget content interface component and at least one vertical widget content interface component; and storing of the generated object page interface template in association with the first user identifier in an object page template repository.

In some embodiments, the object page template repository comprises a plurality of user-generated object page interface templates, each of the user-generated object page interface templates associated with a user identifier.

In some embodiments, the widget selection requests comprises a widget component identifier. In some embodiments, each of the widget component identifiers corresponds to an attributes widget component, a connected tickets widget component, a comments widget component, an attachments widget component, a references widget component, an object history widget component, or a query widget component. In still further embodiments, the method comprises retrieving one or more widget configuration items based upon at least the received widget component identifiers; rendering a widget configuration interface to the object page configuration interface based upon the retrieved one or more widget configuration items; receiving one or more widget configuration item selection requests in response to user interaction with the widget configuration interface; and generating the object page interface template based at least upon the received widget selection requests and the received widget configuration item selection requests.

In some embodiments, the object page configuration request comprises the first user identifier and an object type, the method further comprising retrieving widget configuration items based upon at least the received widget component identifiers and the object type. In still further embodiments, each of the one or more horizontal widget selection requests comprises a horizontal orientation identifier and each of the one or more vertical widget selection requests comprises a vertical orientation identifier. In some embodiments, retrieving widget configuration items is based upon at least the received widget component identifiers and the associated orientation identifiers.

In some embodiments, retrieving widget configuration items is based upon at least the received widget component identifiers and a user role associated with the first user identifier.

In some embodiments, the method further comprises receiving an object page display request comprising the first user identifier and an object identifier; retrieving the generated object page interface template associated with the first user identifier from the object page template repository; retrieving a subset of object data associated with the object identifier and the generated object page interface template from an object data repository; dynamically instantiating the generated object page interface template with the retrieved subset of object data by programmatically mapping the subset of object data to one or more particular widget fields in the generated object page interface template; and rendering the dynamic instantiation of the generated object page configuration interface template to an object page interface on the visual display of the computing device.

In still further embodiments, the object page configuration interface comprises the horizontal widget selection interface, the vertical widget selection interface, and an object type selection interface, and the method further comprises receiving an object type selection request in response to user interaction with the object type selection interface, the object type selection request comprising an object type identifier; and storing the generated object page interface template in association with the first user identifier and the object type identifier in the object page template repository.

In still further embodiments, the object page configuration request comprises a first user identifier associated with a first user and object type identifier and the method further comprises storing the generated object page interface template in association with the first user identifier and the object type identifier in the object page template repository.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
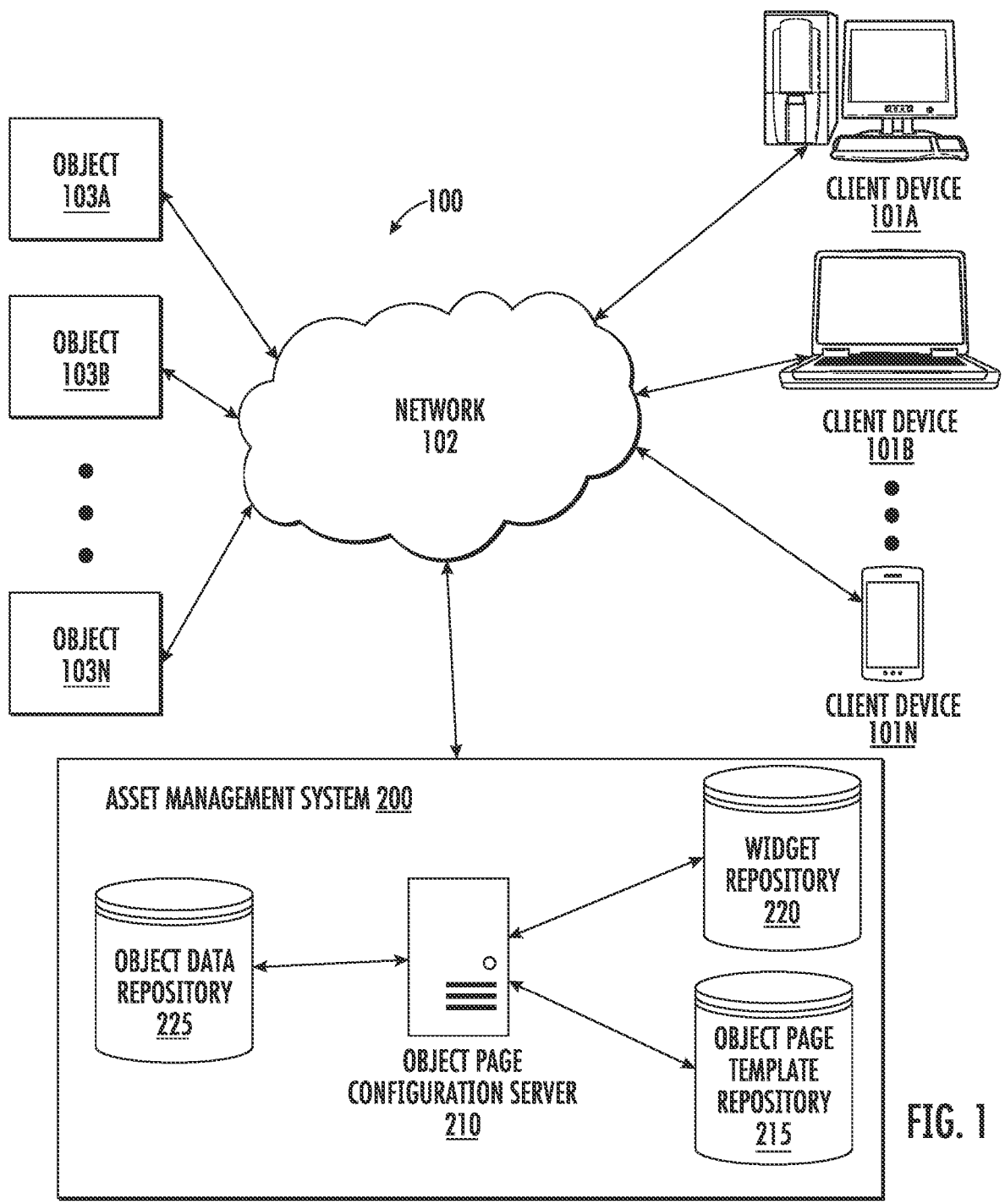
Figure 2:
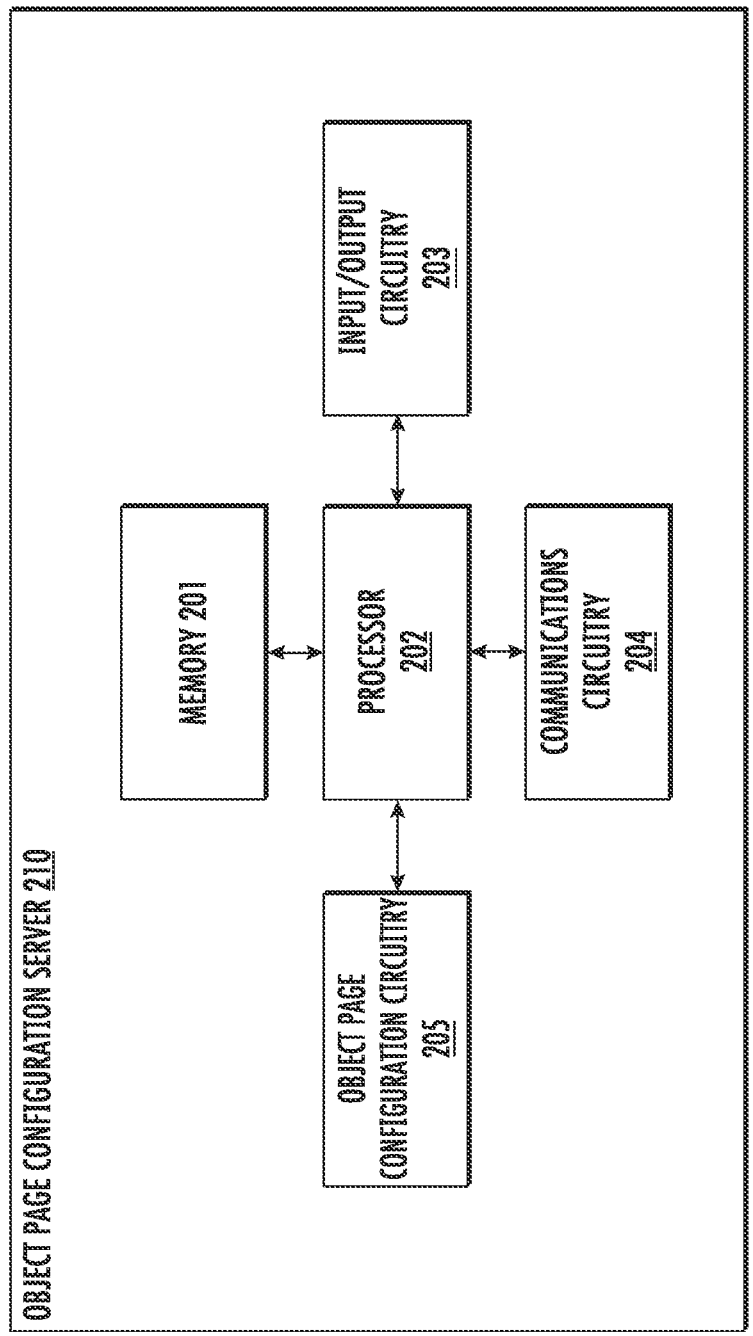
Figure 3:
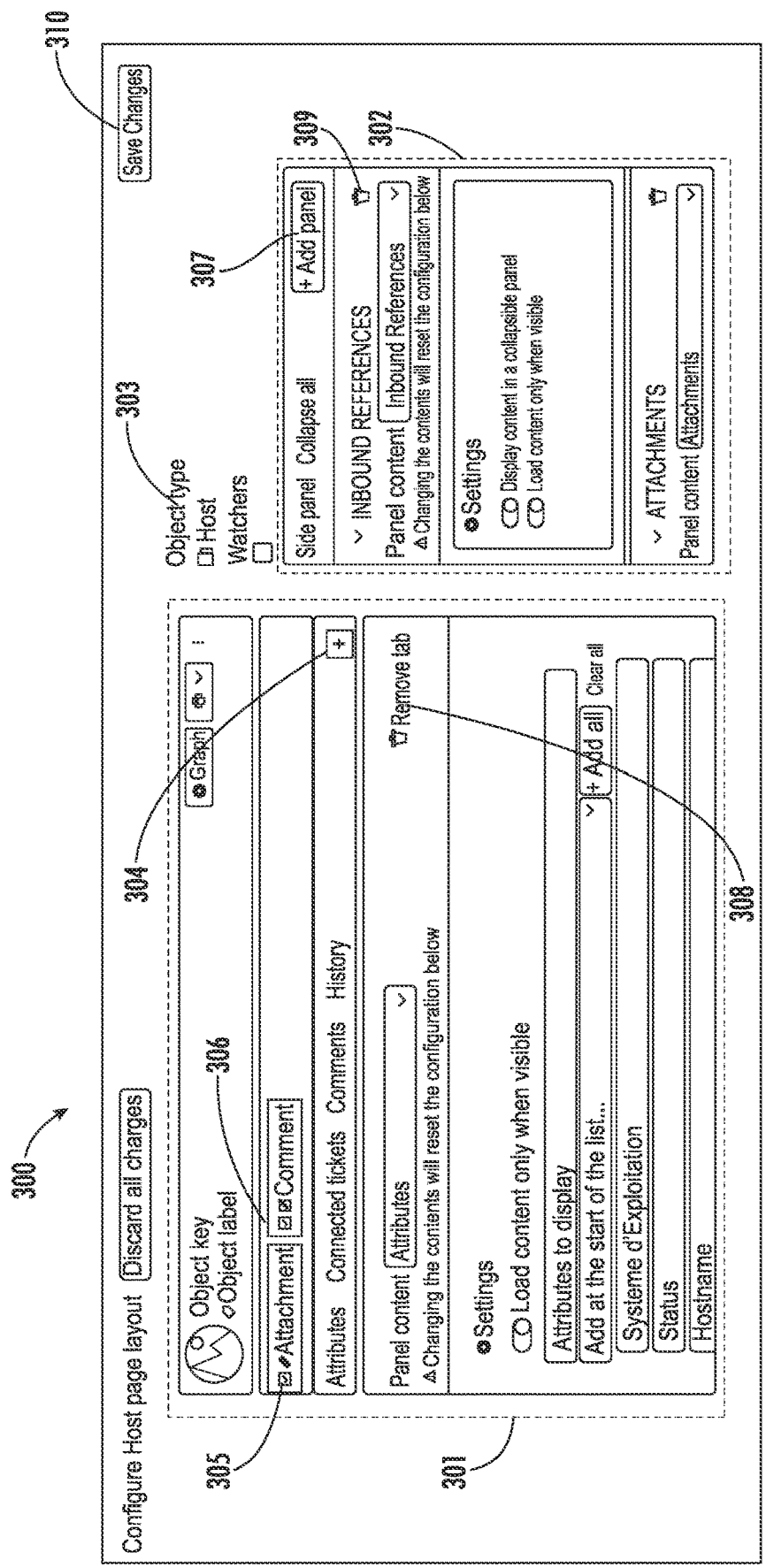
Figure 4:
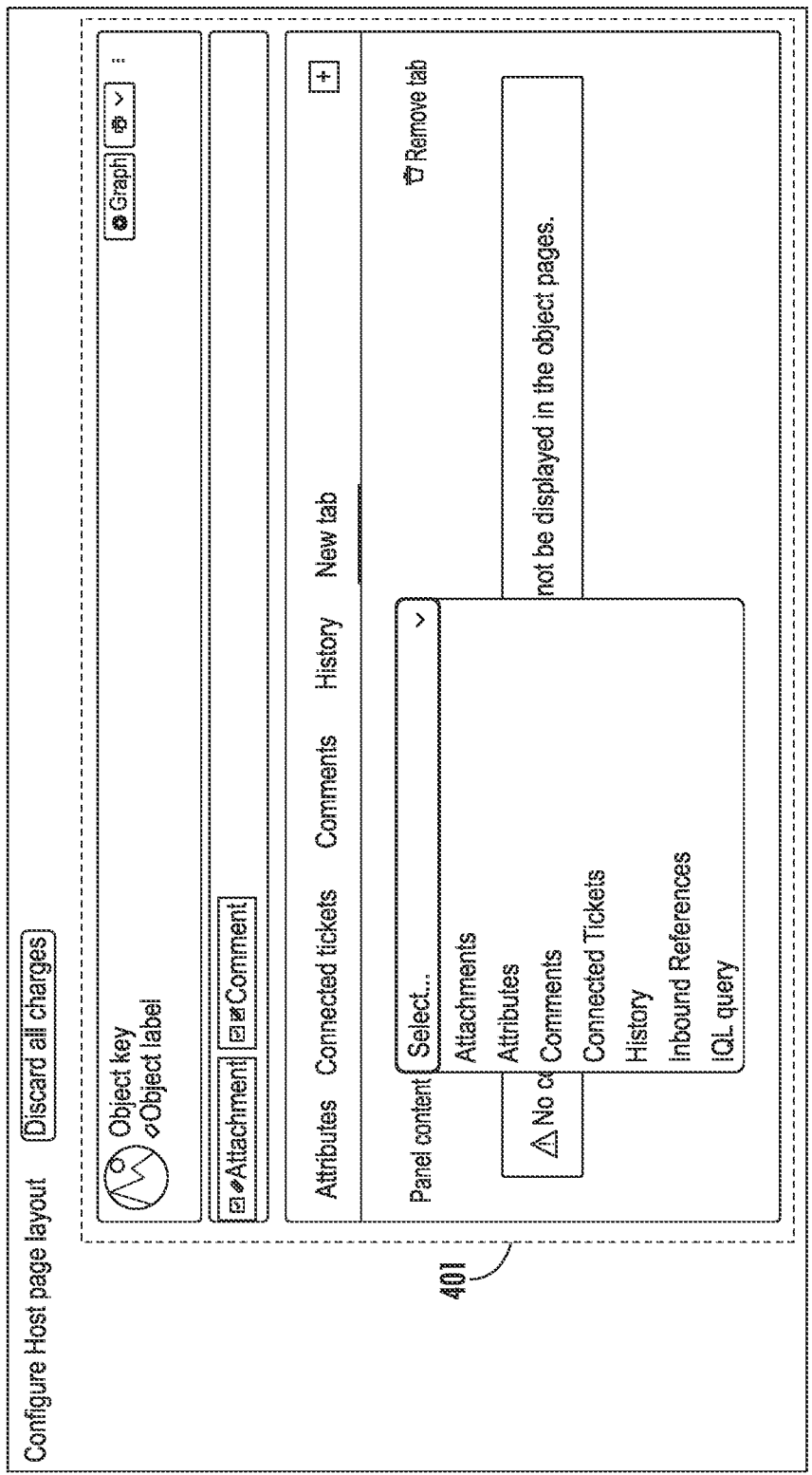
Figure 5:
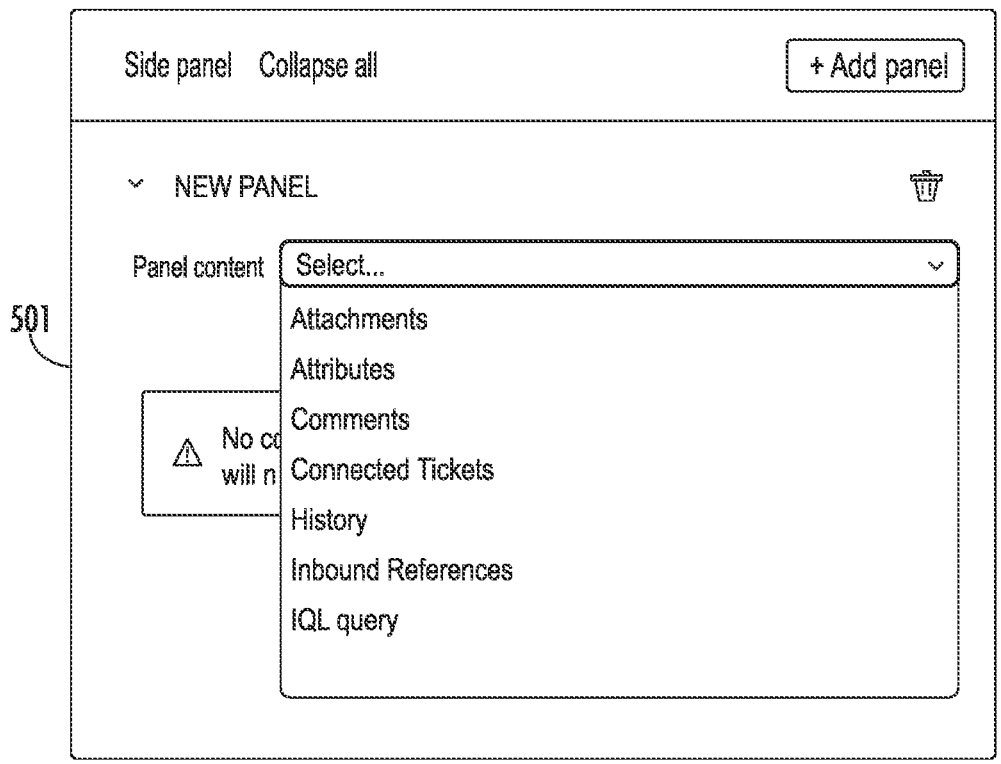
Figure 6:
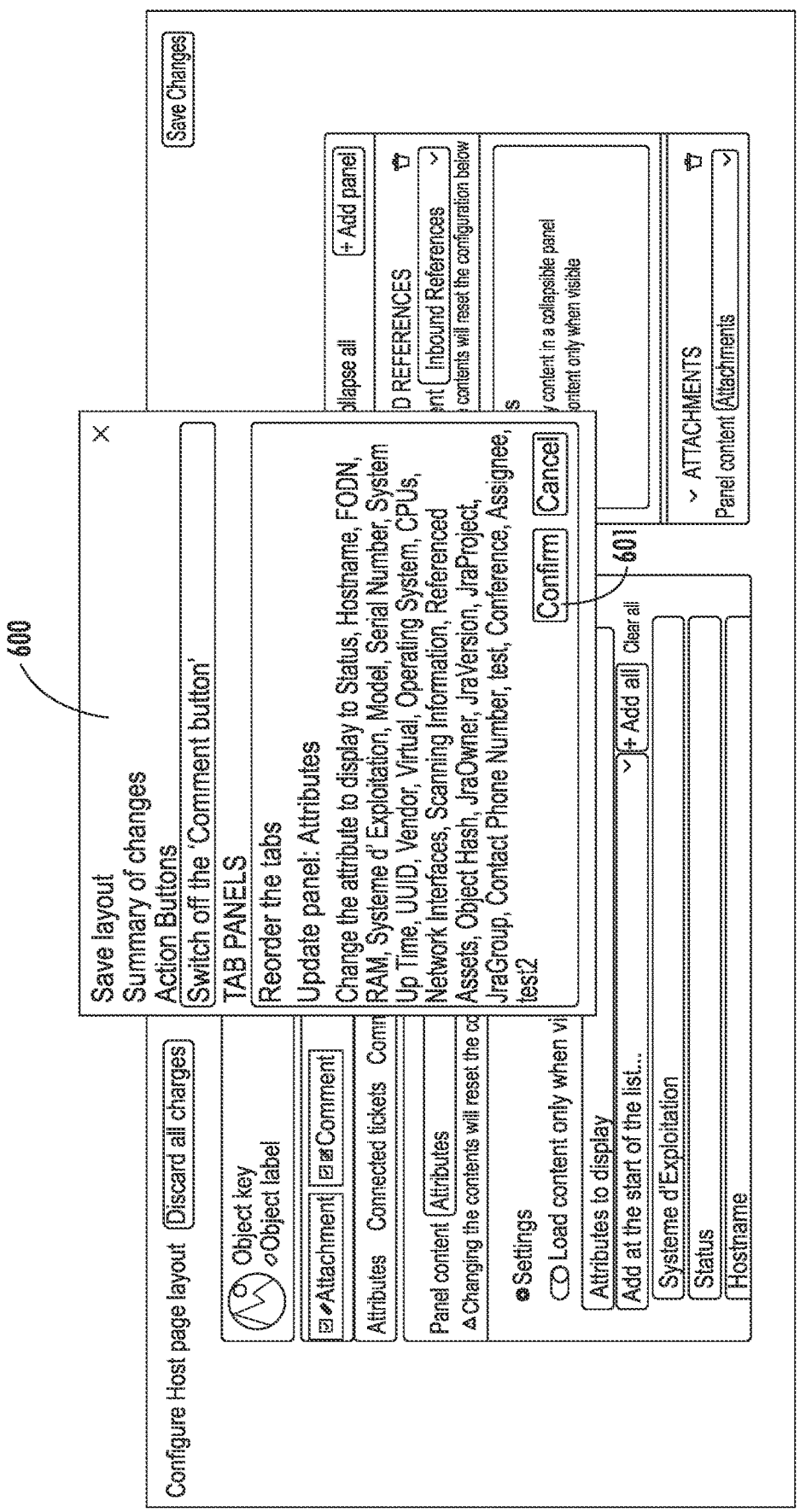
Figure 7A:
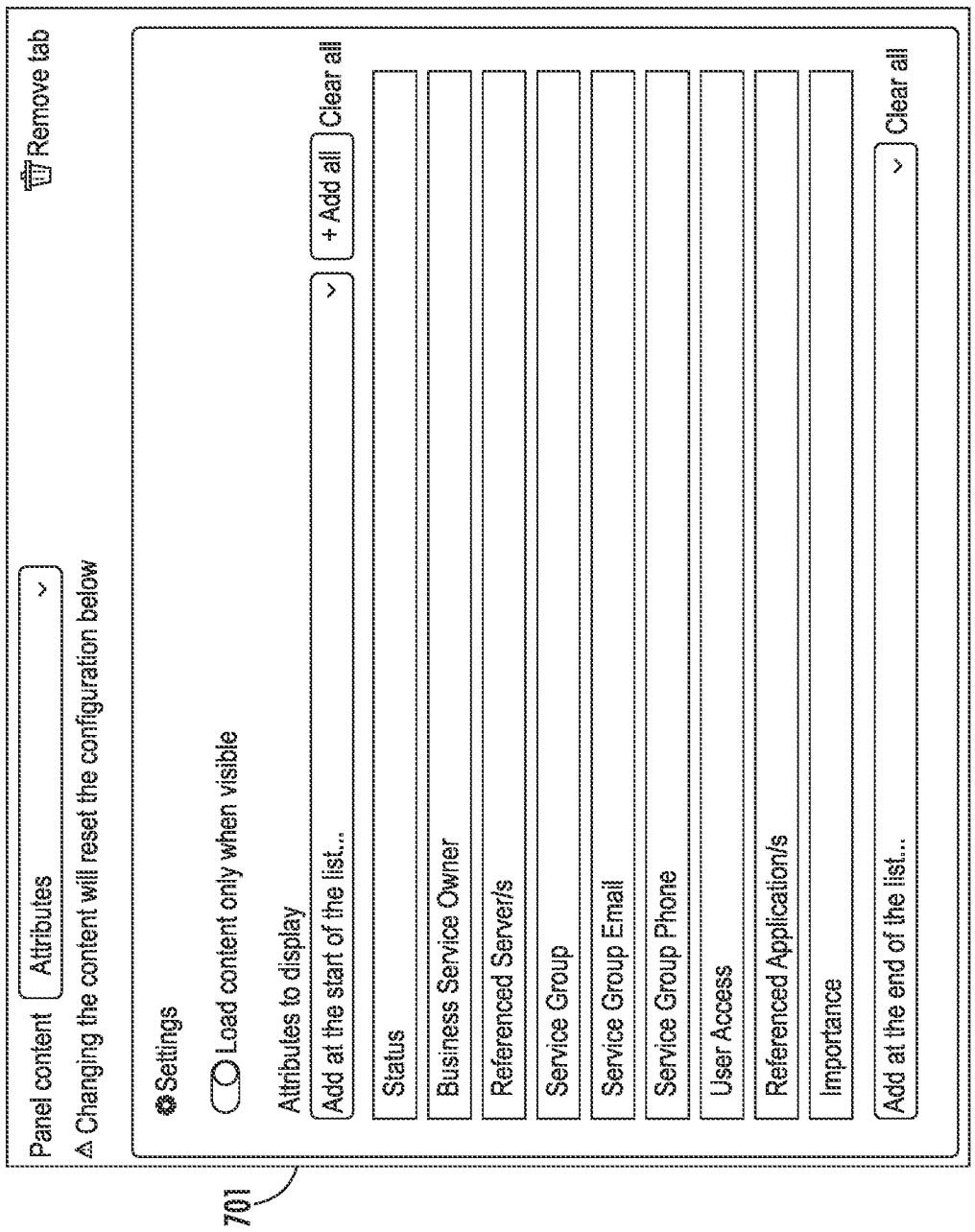
Figure 7B:
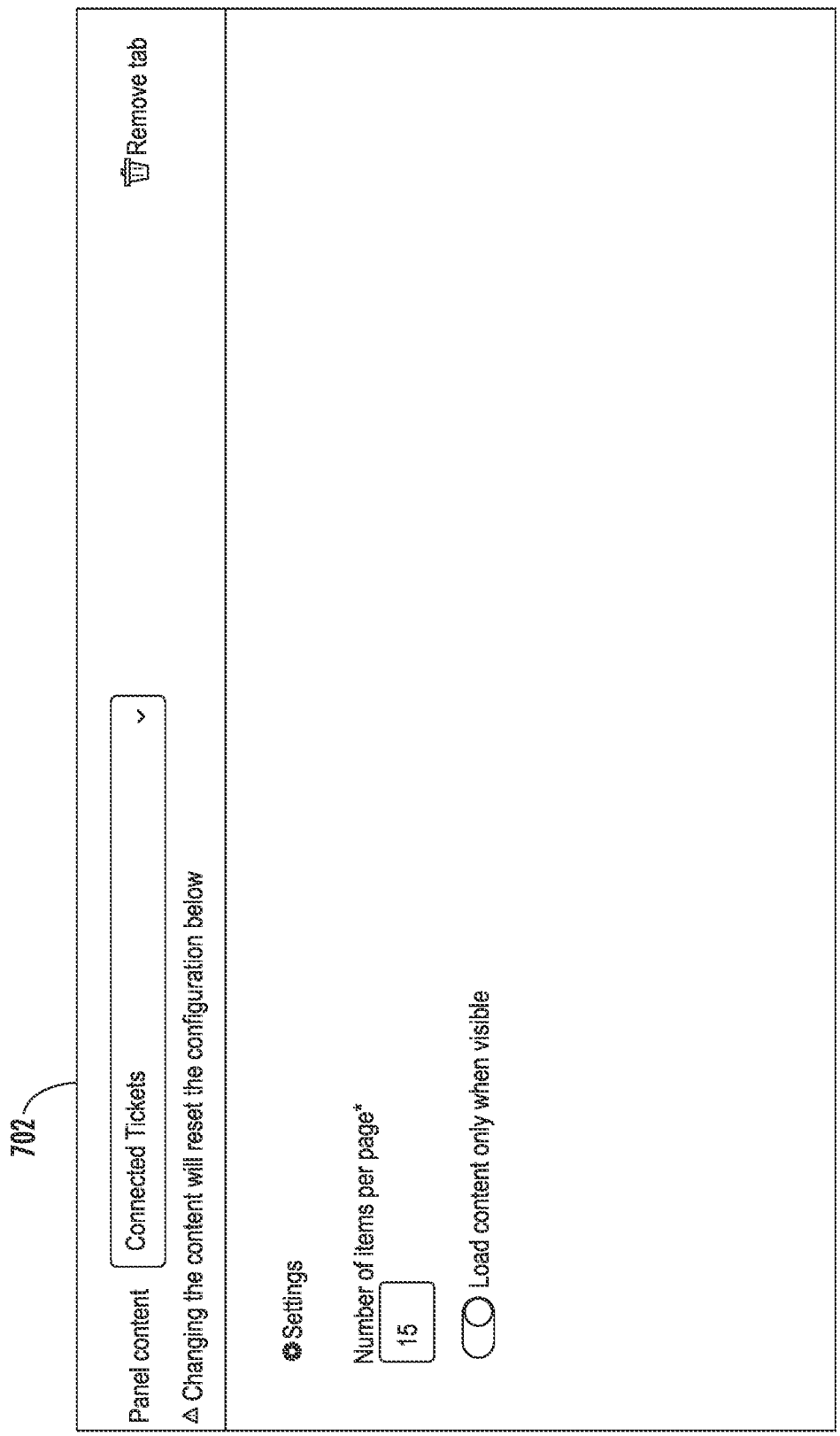
Figure 7C:
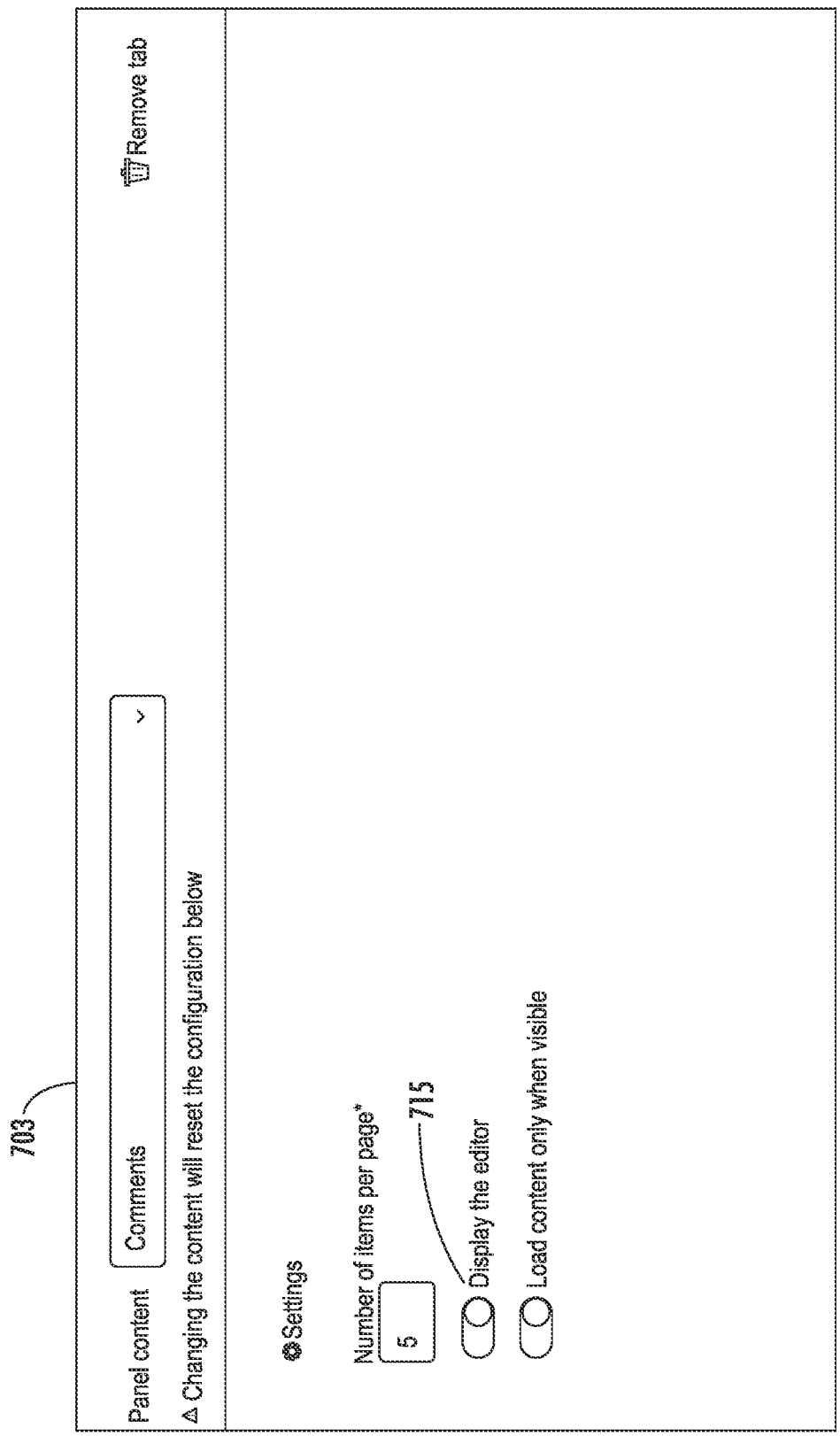
Figure 7D:
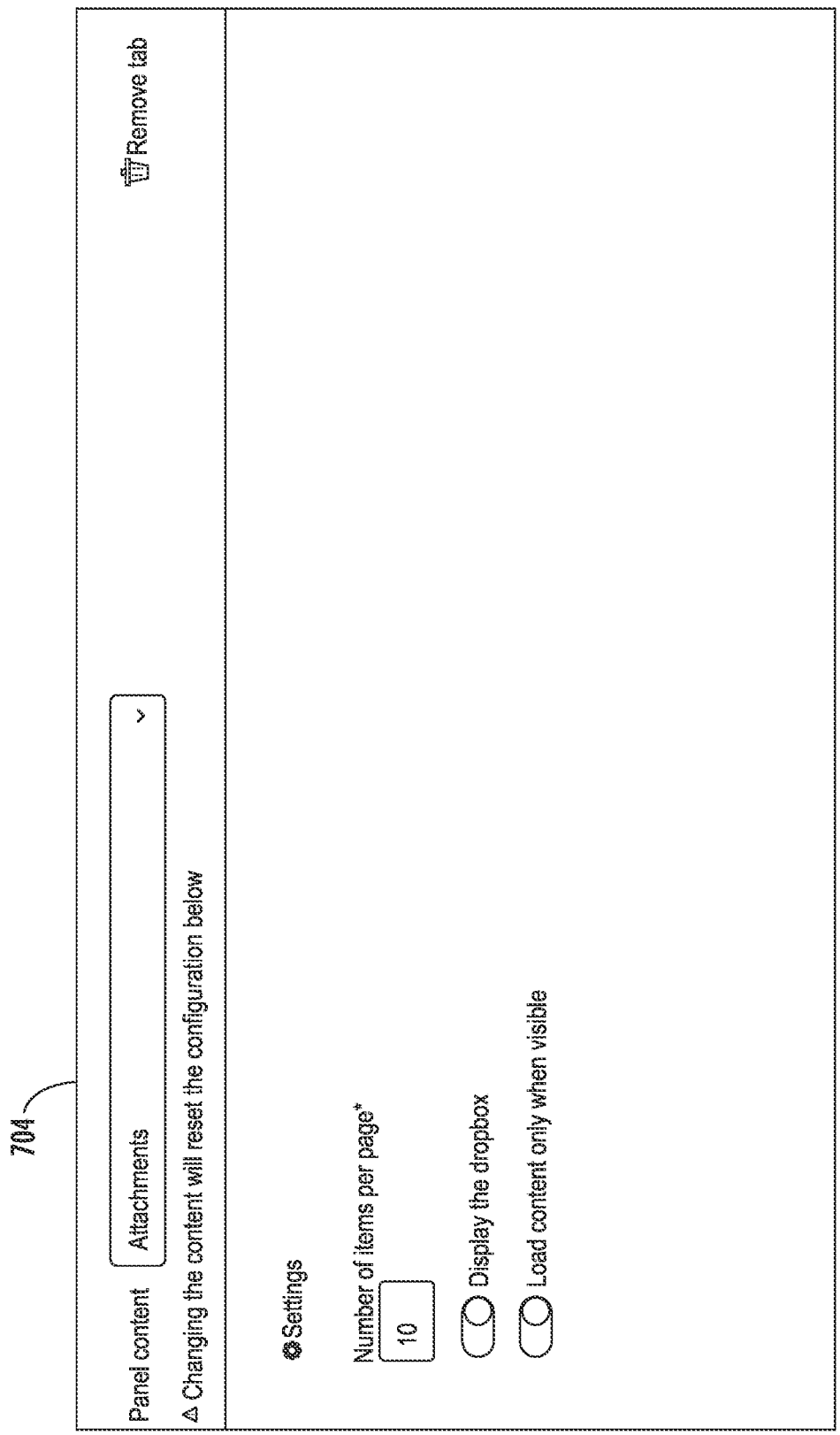
Figure 7E:
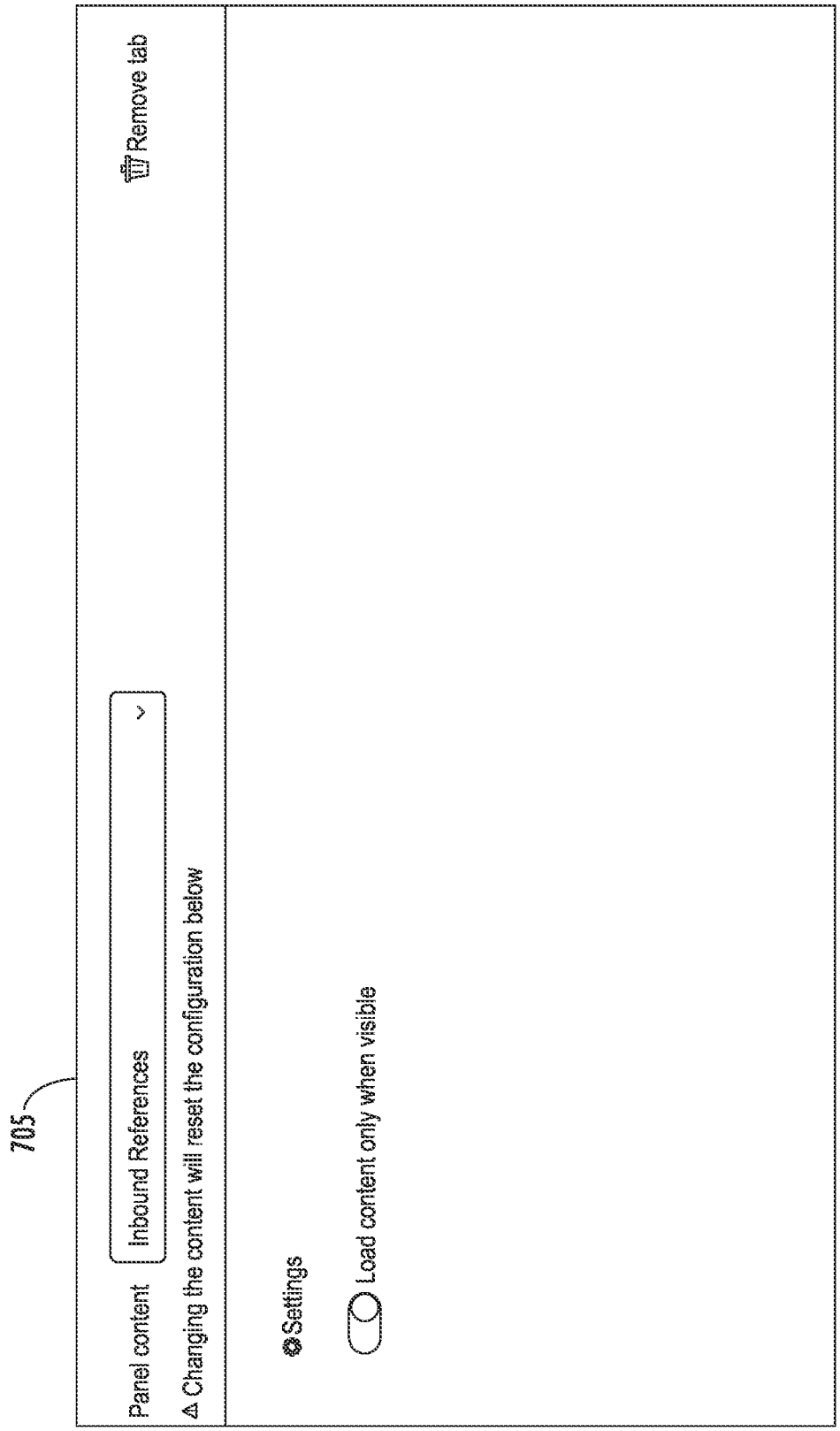
Figure 7F:
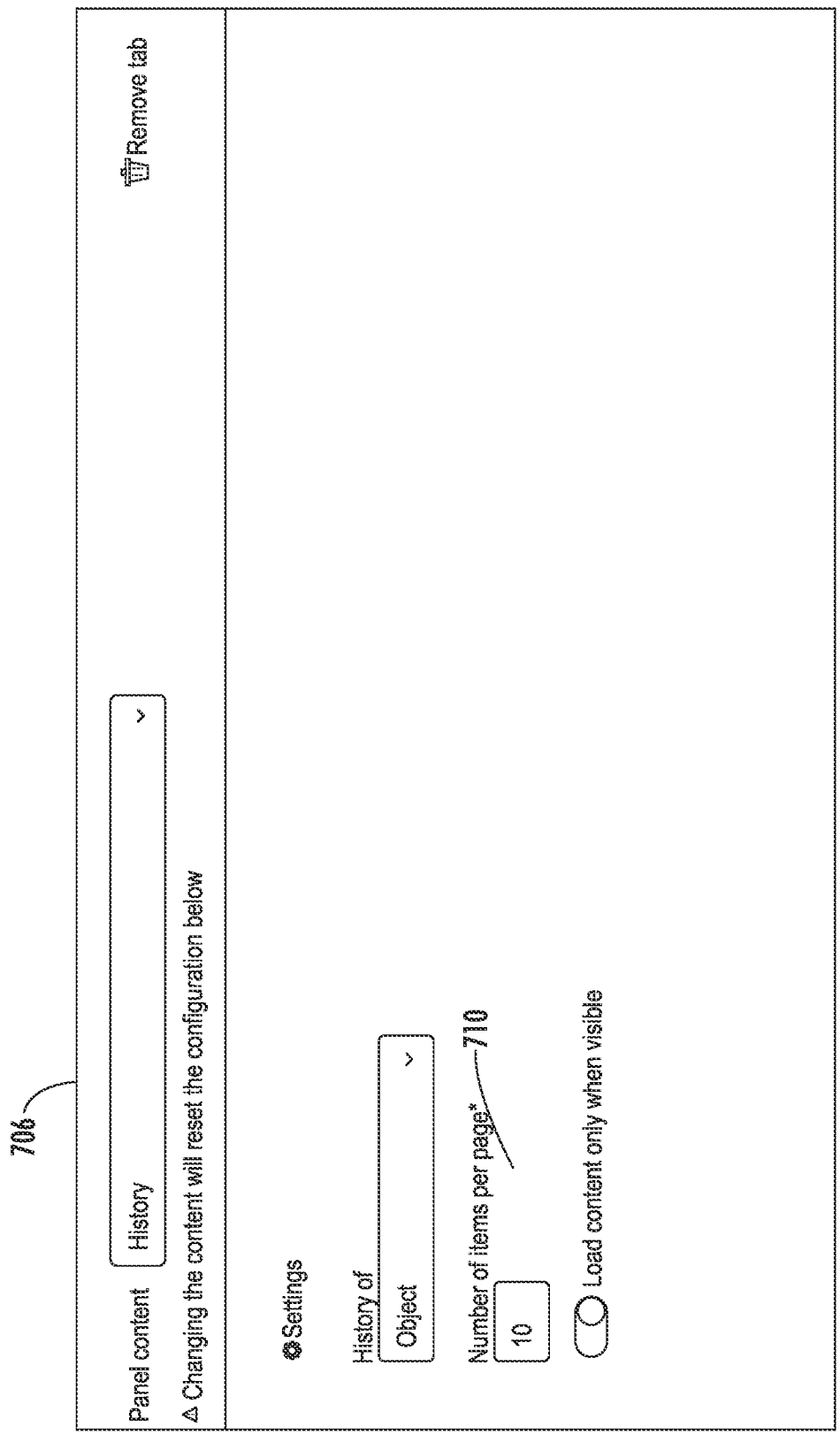
Figure 8B:
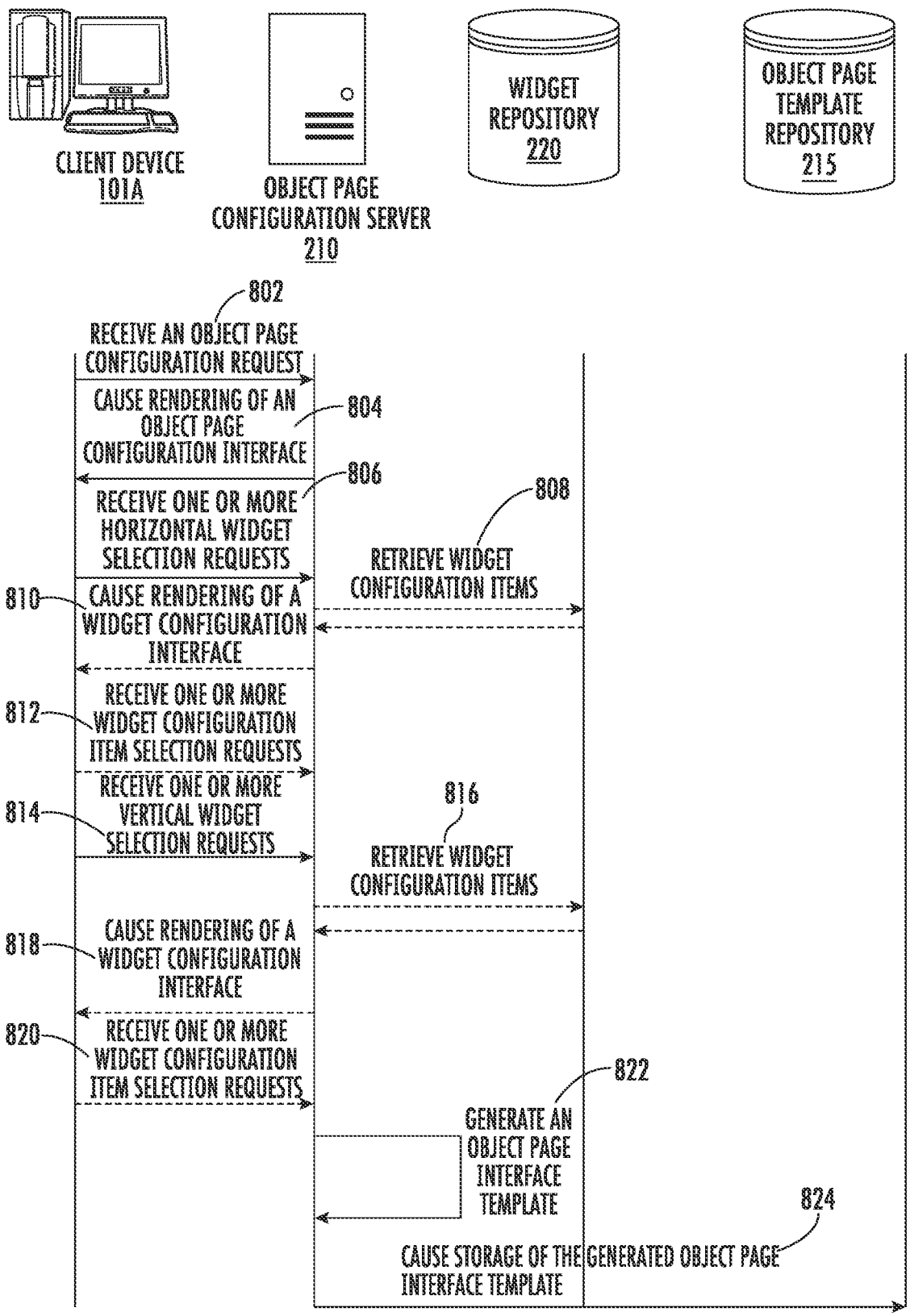
Figure 9A:
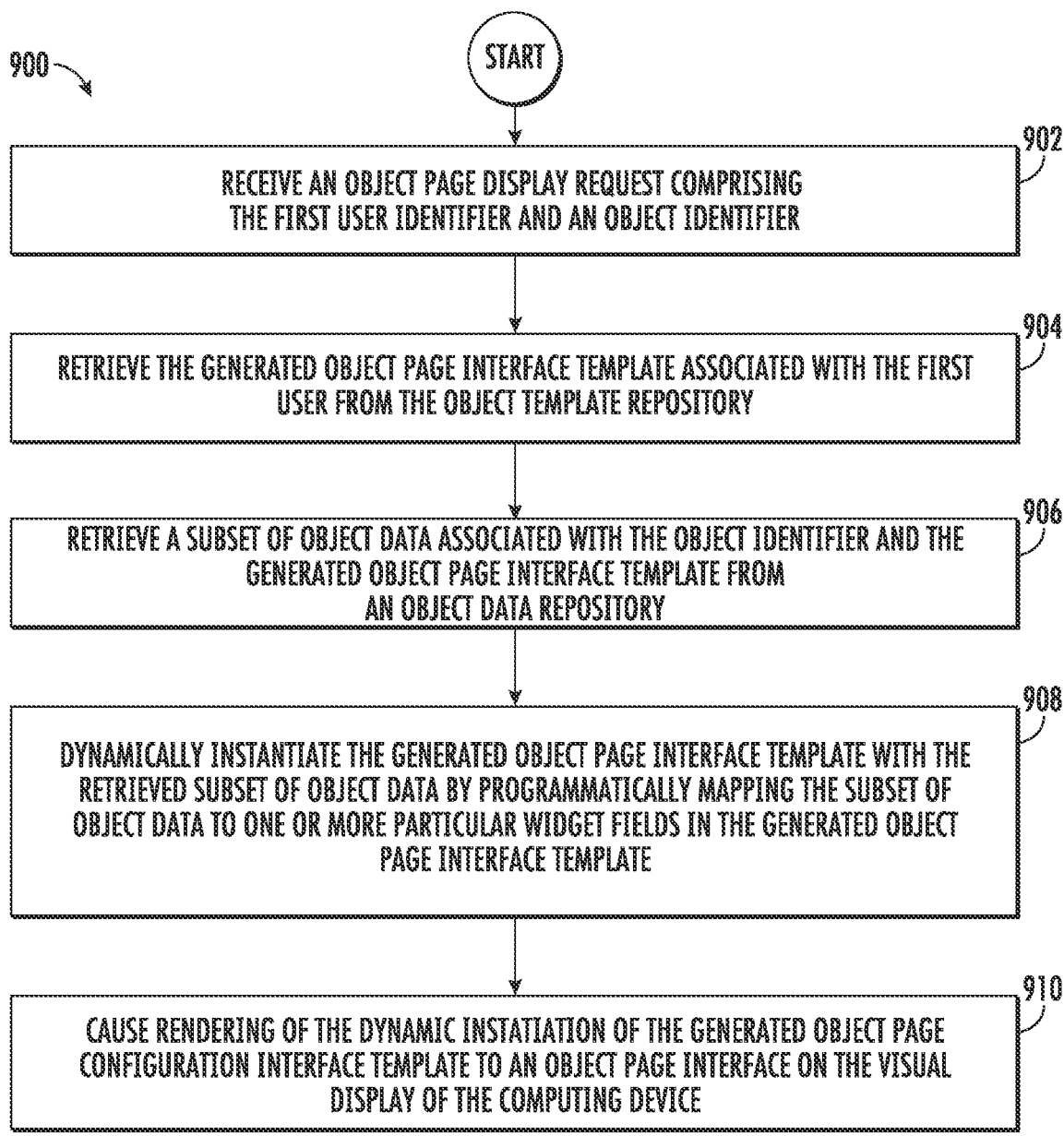
Figure 9B:
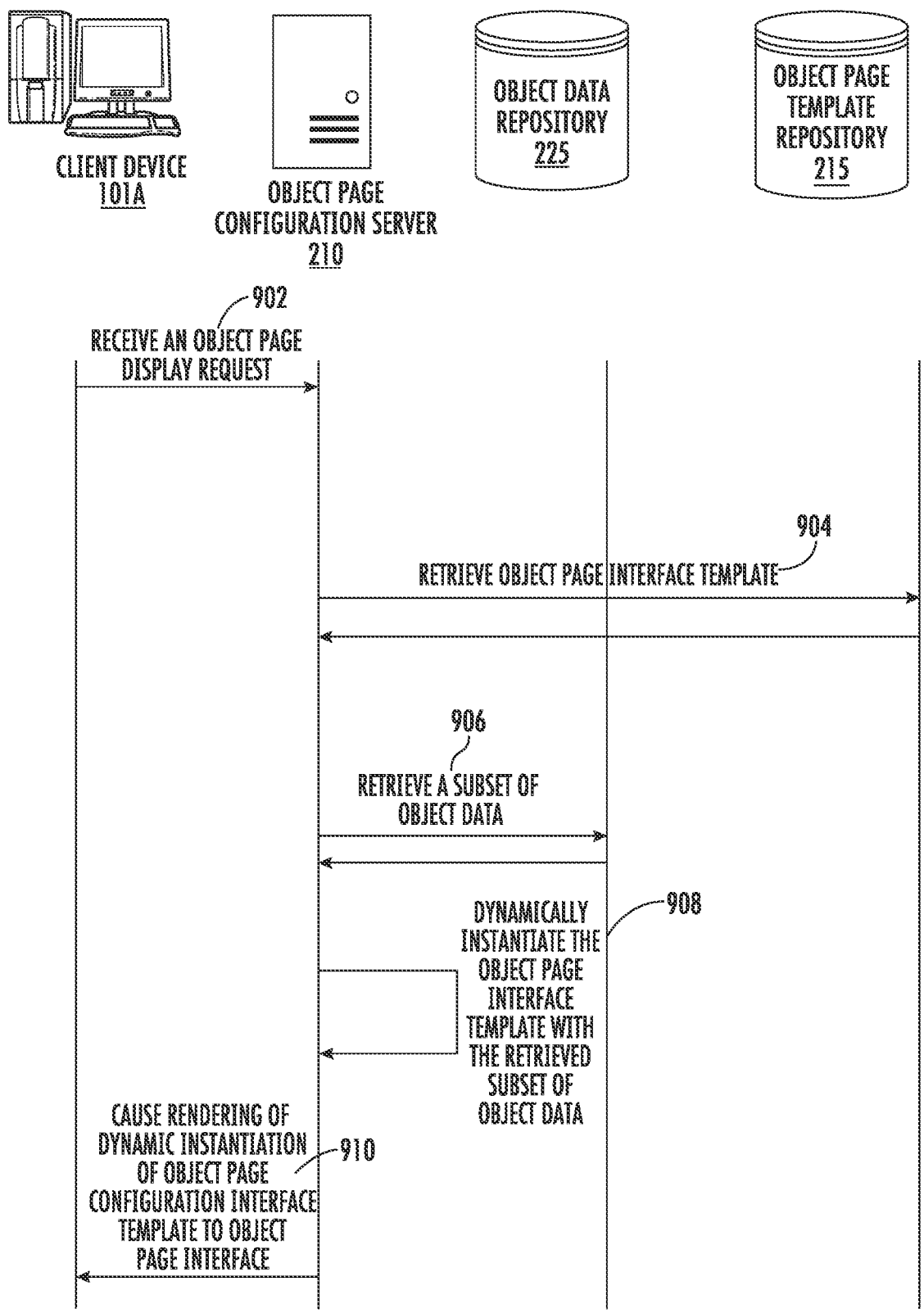

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates a system diagram including devices that may be involved in some example embodiments described herein;

FIG. 2 is a schematic block diagram of example circuitry that may perform various operations in accordance with various aspects and embodiments of the subject disclosure;

FIG. 3 illustrates an example object page configuration interface structured in accordance with example embodiments of the subject disclosure;

FIG. 4 illustrates an example horizontal widget selection interface structured in accordance with an example embodiment of the subject disclosure;

FIG. 5 illustrates an example vertical widget selection interface structured in accordance with an example embodiment of the subject disclosure;

FIG. 6 illustrates an example save changes confirmation interface structured in accordance with an example embodiment of the subject disclosure;

FIG. 7A illustrates an example attributes widget configuration interface structured in accordance with an example embodiment of the subject disclosure;

FIG. 7B illustrates an example connected tickets widget configuration interface structured in accordance with an example embodiment of the subject disclosure;

FIG. 7C illustrates an example comments widget configuration interface structured in accordance with an example embodiment of the subject disclosure;

FIG. 7D illustrates an example attachments widget configuration interface structured in accordance with an example embodiment of the subject disclosure;

FIG. 7E illustrates an example inbound references widget configuration interface structured in accordance with an example embodiment of the subject disclosure;

FIG. 7F illustrates an example history widget configuration interface structured in accordance with an example embodiment of the subject disclosure;

FIG. 7G illustrates an example query widget configuration interface structured in accordance with an example embodiment of the subject disclosure;

FIG. 8A is a flowchart illustrating example operations for managing an object page configuration interface in accordance with various aspects and embodiments of the subject disclosure;

FIG. 8B is a signal diagram of an example data flow in accordance with various aspects and embodiments of the subject disclosure;

FIG. 9A is a flowchart illustrating example operations for dynamically instantiating an object page interface template to an object page interface in accordance with various aspects and embodiments of the subject disclosure; and FIG. 9B is a signal diagram of an example data flow in accordance with various aspects and embodiments of the subject disclosure.

DETAILED DESCRIPTION

One or more embodiments are now more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server as an example "apparatus." However, elements of the apparatus described herein may be equally applicable to the claimed method and computer program product. Accordingly, use of any such terms should not be taken to limit the spirit and scope of embodiments of the present disclosure.

Overview

Various embodiments of the present disclosure relate generally to an improved object page configuration interface, for example, as shown in FIG. 3, that is configured to enable a user (e.g., an IT administrator, enterprise employee, HR representative) to customize or tailor the layout, structure, and/or pertinent information to be presented to the user in an object page interface associated with a selected asset, object, or resource in an asset management system. The object page configuration interface may be used as part of a standalone service, application, or device or it may be applied as a layer atop an existing service, application, or device (e.g., an existing asset management system).

As will be discussed in greater detail below, the object page configuration interface comprises a horizontal widget selection interface and a vertical widget selection interface. An object page interface template, comprising at least one horizontal widget content interface component and at least one vertical widget content interface component, is generated and stored in association with a user identifier based at least in part on received horizontal and vertical widget selection requests in response to user interaction with the respective widget selection interfaces of the object page configuration interface. Each object page interface template is separate and distinct from other object page interface templates. In response to an object page display request comprising the user identifier and an object identifier, an object page interface of the selected object is arranged, compiled, and dynamically instantiated in accordance with the object page interface template.

It is undesirable for asset management systems and associated interfaces to not account for user preference, user relevance, the variety of specific data needs or interests associated with different roles within an organization or enterprise, flexibility, and disparate levels of programming experience. Indeed, such undesirable systems and interfaces may be further plagued by many technical restrictions and limitations. For example, as requests for access to information associated with assets, objects, or resources can be time-sensitive and such requested information can be dynamic and varied in nature, it is undesirable for such technical limitations to compromise data integrity and overburden or deplete network resources. Moreover, it is undesirable to provide all data associated with a selected asset or object, including superfluous information that may be confidential or irrelevant to the user, in response to a request for access to such data, thereby increasing network traffic and unnecessary computing resource consumption (for example, an increase in processor workload) of the system when examples of the present disclosure are not implemented. This problem may be exacerbated as the number of users and objects, assets, and resources (and associated amount of information and data) increase for any particular asset management system. Such a configuration is not only inefficient and complicated, but also counter-intuitive to the underlying purpose of an asset management system.

Example embodiments of the present disclosure may overcome the above-referenced technical challenges while providing various technical benefits. For example, various embodiments of the present disclosure increase the efficiency and effectiveness of an asset management system. In certain instances, it may be desirable for users to access, control, and/or manage a subset (e.g. a limited set) of object data that is relevant and/or important to the user's role or work to be accomplished within the organization, rather than overwhelming the user with all object data associated with a selected object.

From the user experience perspective, object page configuration interfaces structured in accordance with various embodiments of the present disclosure enable each user to maintain its own preferences that apply to its respective object page interface template, thereby greatly enhancing organizational productivity and efficiency by providing a customizable and appropriate level of visibility of pertinent data in an associated object page interface. For example, an object page configuration interface structured in accordance with various embodiments of the present disclosure enables users to spend less time navigating an overwhelming mixture of relevant and irrelevant information when viewing an object page interface and instead, allows a user to quickly access and review object data relevant to, for example, the user's preferences and/or roles within the organization, such object data organized in a selection of horizontal and vertical horizontal widget content interface components.

Applicant has identified that methods, apparatus, systems, and computer program products structured in accordance with certain embodiments of the present disclosure provide reduced network traffic and computing resource consumption by only transmitting a subset of object data (e.g., associated with an object page interface template) rather than the entirety of the object data associated with a selected object. Such reduced network traffic and data processing amounts to increased security and less strain on the asset management system itself, leading to increased lifetime and efficiency of the asset management system. Moreover, by permitting object data (or a limited set of object data) to be organized and relocated for display in a selection of horizontal and vertical horizontal widget content interface components, the system's ability to display information and interact with the user is improved. As such, systems structured in accordance with various embodiments of the present disclosure may reduce computing resource consumption and provide specific, technical solutions to technical problems faced by existing systems, the details of which are described hereafter.

The various implementations of the object page configuration interface of the present disclosure is not limited to displaying object data associated with a selected object in an asset management system and can instead be configured to display a wide variety of data characteristics for any set of data that might be of interest to a user. The object page configuration interface may be used to visualize any set of object, asset, or resource data for any purpose and it may be used in connection with numerous exemplary system architectures as explained in further detail herein. One of ordinary skill in the art will appreciate that the object page configuration interface related concepts discussed herein may be applied to better visualize characteristics of interest for a wide variety of object and/or data sets.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

As used herein, the term "user identifier" refers to one or more items of data by which a user may be identified within an asset management system. For example, a user identifier may comprise ASCII text, a pointer, an IP address, a MAC address, a memory address, or other unique identifier.

The term "object page configuration server" refers to a software platform and associated hardware that is configured to manage the various object page and widget configuration interfaces of the asset management system. The object page configuration server is accessible via one or more computing devices, is configured to receive configuration requests, and access one or more data repositories such as a widget repository or an object page template repository. The functionality of the object page configuration server may be provided via a single server or collection of servers having a common functionality, or the functionality of the object page configuration server may be segmented among a plurality of servers or collections of servers performing subsets of the described functionality of the object page configuration server.

The term "object page configuration interface" refers to a user interface element that is rendered to a visual display and is configured (e.g., provides options) to enable a user to customize the layout, structure, and/or object information to be visually represented in an object page interface in an asset management system. Exemplary object page configurations interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the object page configuration interface 300 of FIG. 3 is an example of an object page configuration interface.

The term "object page configuration request" refers to an electrically generated digital object created by a computing device that indicates that a user has provided an input comprising a request to configure an object page interface template. An object page configuration request may be represented via a temporary code that notifies a recipient (e.g., a server) that a user has made the request. To provide further context, an object page configuration request is generated in response to a user interaction with a computing device wherein a user causes the computing device to generate an object page configuration request by interacting with, for example, a specific object page configuration actuator button rendered on a visual display of the computing device.

The term "horizontal widget selection interface" refers to a user interface element that is rendered as a portion of an object page configuration interface and is configured to enable a user to view and interact with the interface in order to select one or more widget components to be rendered in a horizontal arrangement in an object page template and/or an object page interface. For example, the horizontal widget selection interface 301 of FIG. 3 is an example of a horizontal widget selection interface.

The term "vertical widget selection interface" refers to a user interface element that is rendered as a portion of an object page configuration interface and is configured to enable a user to view and interact with the interface in order to select one or more widget components to be rendered in a vertical arrangement in an object page template and/or an object page interface. For example, the vertical widget selection interface 302 of FIG. 3 is an example of a vertical widget selection interface.

The term "object type selection interface" refers to a user interface element that is rendered as a portion of an object page configuration interface and is configured to enable a user to view and interact with the interface in order to select an object type to be associated with an object page template. For example, the object type selection interfaces 303 of FIG. 3 is an example of an object type selection interface.

The term "horizontal widget selection request" refers to an electrically generated digital object created by a computing device upon user engagement with a horizontal widget selection interface that indicates that a user has provided an input comprising a request to configure a selected widget component to be rendered in a horizontal arrangement in an object page template and/or an object page interface A horizontal widget selection request may be represented via a temporary code that notifies a recipient (e.g., a server) that a user has made the request. To provide further context, a horizontal widget selection request is generated in response to a user interaction with a computing device, for example, with a horizontal widget selection interface rendered as a portion of an object page configuration interface, wherein a user causes the computing device to generate a horizontal widget selection request by interacting with, for example, an indication of a selection of a widget component from a dropdown menu or an actuator button associated with a widget component, the actuator button rendered on a visual display of the computing device.

The term "vertical widget selection request" refers to an electrically generated digital object created by a computing device upon user engagement with a vertical widget selection interface that indicates that a user has provided an input comprising a request to configure a selected widget component to be rendered in a vertical arrangement in an object page template and/or an object page interface. A vertical widget selection request may be represented via a temporary code that notifies a recipient (e.g., a server) that a user has made the request. To provide further context, a vertical widget selection request is generated in response to a user interaction with a computing device, for example, with a vertical widget selection interface rendered as a portion of an object page configuration interface, wherein a user causes the computing device to generate a vertical widget selection request by interacting with, for example, an indication of a selection of a widget component from a dropdown menu or an actuator button associated with a widget component, the actuator button rendered on a visual display of the computing device.

The term "object type selection request" refers to an electrically generated digital object that indicates that a user has provided an input comprising a request to select an object type to be associated with an object page template. An object type selection request may be represented via a temporary code that notifies a recipient (e.g., a server) that a user has made the request. To provide further context, an object type selection request is generated in response to a user interaction with a computing device wherein a user causes the computing device to generate an object type selection request by interacting with, for example, an indication of a selection of an object type from a dropdown menu or an actuator button associated with an object type, the actuator button rendered on a visual display of the computing device.

The term "object page interface template" should be understood to refer to the format, layout, organization, structure, arrangement, and/or display of content and/or information (e.g., widget components, widget component items, object data, and the like) used to render an object page interface of a selected object in an asset management system. As such, the object page interface template defines the selected object data, including the structure and/or organization of such selected object data, to be displayed in response to receipt of an object page display request. For example, in some embodiments, the object page interface template comprises a horizontal widget content interface component, a vertical widget content interface component, or a combination thereof. The term "horizontal widget content interface component" should be understood to refer to the arrangement of one or more horizontal widget components in an object page interface template, such that the horizontal widget component(s) are rendered in a horizontal format in relation to one another pursuant to a dynamic instantiation of the object page interface template to an object page interface for a selected object in an asset management system. Similarly, the term "vertical widget content interface component" should be understood to refer to the arrangement of one or more vertical widget components in an object page interface template, such that the vertical widget component(s) are rendered in a vertical format in relation to one another pursuant to a dynamic instantiation of the object page interface template to an object page interface for a selected object in an asset management system.

In still further embodiments, each object page interface template is associated with a unique object page interface template identifier. For example, a user may have multiple, different object page interface templates associated with a user identifier, each object page interface template associated with a unique object page template identifier. An object page interface template identifier is one or more items of data by which an object page interface template is uniquely identified in the asset management system, for example, the asset management system 200 as illustrated in FIG. 1. In some embodiments, the object page interface template identifier is generated at the client device 101A-101N by the user's confirmation of the client session associated with an object page configuration interface and is transmitted as part of, or in association with, the respective object page configuration request to the object page configuration server 210. In some embodiments, the object page interface template identifier is generated at the apparatus in associated with storing the object page interface template.

In some embodiments, the apparatus dynamically instantiates the object page interface template with object data to render an object page interface. For example, in certain embodiments, the object page interface template comprises widget fields and the apparatus programmatically maps object data or a subset of object data to one or more particular widget fields in the object page interface template to render the object page interface. In some embodiments, the object page interface template is associated with a user identifier such that the object page interface template is user-specific. For example, in some embodiments, the specific configuration of a horizontal widget content interface component and a vertical widget content interface component in an object page interface template associated with a first user identifier differs from the configuration in an object page interface template associated with a second user identifier. In certain embodiments, the object page interface template is associated with an object type identifier such that the object page interface template is object type-specific. In still further embodiments, the object page interface template is associated with a user identifier and an object type identifier.

The term "object page template repository" refers to a structured data set or computing location, such as a memory device, where data is stored, accessed, modified and otherwise maintained by the object page configuration server. The stored data includes information that facilitates the operation of the asset management system. The object page template repository may be embodied as a data storage device or devices, as a separate database server or servers, or as a combination of data storage devices and separate database servers. The object page template repository may be a dedicated device and/or a part of a larger repository. In some embodiments, the object page template repository stores data that is generated based on user input, user selections, and user interaction with the asset management system in association with the object page configuration interface and its related interface elements. Such data can be queried and retrieved by the object page configuration server.

The term "widget component" is an interface component rendered to an object page interface, the component visually organizing a display of a subset of related object data associated with a selected object in an object page interface. For example, a widget component includes, but is not limited to, an attributes widget component, a connected tickets widget component, a comments widget component, an attachments widget component, a references widget component, an object history widget component, a query widget component, or any other component that may serve to provide a subset of related object data associated with an object. In some embodiments, a widget component is capable of being rendered to an object page interface in two or more states or formats. For example, in some embodiments, a widget component is a selectable element rendered in a first contracted or reduced format which is expandable to a second expanded format in response to user interaction with the selectable first contracted or reduced format. For example, in certain embodiments, the first contracted or reduced format is a tab or other selectable element containing a title of the widget component, the tab expanding to a panel format in response to user interaction with the tab, the panel allowing for additional information including but not limited to, one or more widget configuration items, to be displayed to the user. In a non-limiting example, an attributes widget component in a reduced format (e.g., an attributes widget tab) displaying a title of the attributes widget component is expanded to an expanded format in response to user interaction with the tab, the expanded panel displaying additional information, such as certain attributes associated with the selected object, to the user.

In some embodiments, a widget component is a "horizontal widget component" such that each widget component is rendered in a horizontal position in relation to other horizontal widget components. For example, a horizontal widget component may be rendered in a reduced format (e.g., tab), and or in an expanded format (e.g., panel). In certain embodiments, a horizontal widget component is associated with a horizontal orientation identifier. Similarly, in some embodiments, a widget component is a "vertical widget component" such that each widget component is rendered in a vertical position in relation to other vertical widget components. For example, a vertical widget component may be rendered in a reduced format (e.g., a tab or the like), or in an expanded format (e.g., a panel or the like). In certain embodiments, a vertical widget component is associated with a vertical orientation identifier. In certain embodiments, an object page interface comprises one or more horizontal widget components and one or more vertical horizontal widget components.

The term "widget component identifier" refers to one or more items of data by which a widget component and/or widget content interface component may be uniquely identified by an asset management system.

The term "widget component interface object" refers to an object capable of being rendered in association with a widget content interface component to an object page configuration interface, a horizontal widget selection interface, and/or a vertical widget selection interface of a client device. For example, a widget component interface object may comprise a widget component name and/or description of the functionality or purpose of the associated widget component or widget content interface component.

The term "orientation identifier" refers to one or more items of data by which the orientation of a widget component and/or widget content interface component is associated with an object page template and/or to be rendered to an object page interface. An orientation identifier is capable of being transmitted, received, and/or stored. In some embodiments, orientation identifiers comprise a horizontal orientation identifier and a vertical orientation identifier. In some embodiments, a horizontal orientation identifier may refer to a widget component and/or widget content interface component displayed in a main panel of an object page template and/or to be rendered to an object page interface. In still further embodiments, a vertical orientation identifier may refer to a widget component and/or widget content interface component displayed in a side panel of an object page template and/or to be rendered to an object page interface. Such examples, however, are for purposes of illustration and not of limitation and other suitable variations of displays associated with a horizontal orientation identifier or vertical orientation identifier are also contemplated by this disclosure as will be apparent to one of ordinary skill in the art. In certain embodiments, one or more widget configuration items are associated with an orientation identifier such that the subset of available widget configuration items associated with a horizontal widget component and/or widget content interface component may differ from the subset of available widget configuration items associated with a vertical widget component and/or widget content interface component. In a non-limiting example, a first subset of available widget configuration items associated with a vertical attributes widget component differs from a second subset of available widget configuration items associated with a horizontal attributes widget component. In other embodiments, a first subset of available widget configuration items associated with a vertical attributes widget component is the same as a second subset of available widget configuration items associated with a horizontal attributes widget component.

The terms "widget configuration item" and "widget configuration items" refer to configurable settings and/or attributes associated with a widget component and/or widget content interface component. In some embodiments, a user selects one or more widget configuration items to be displayed in association with a widget component, allowing the user to customize the object data to be rendered in association with a selected widget component in an object page interface of an asset management system. In this regard, the widget configuration items associated with a widget component in an object page template may represent a subset or modified version of the available widget configuration items associated with a widget component.

The term "widget configuration interface" refers to a user interface element that is rendered as a portion of an object page configuration interface and is configured to enable a user to view and interact with the interface in order to select one or more widget configuration items to be customized and/or rendered in association with a selected widget component in an object page template and/or an object page interface. For example, the widget configuration interface 701 of FIGS. 7A-7G are examples of widget configuration interfaces associated with horizontal widget components and/or widget content interface components.

The term "widget configuration interface object" refers to an object capable of being rendered in association with a widget configuration item to a widget configuration interface. For example, a widget configuration interface object may comprise a widget configuration item name and/or description of the functionality or purpose of the associated widget configuration item. In some embodiments, a widget configuration interface object is configured for user engagement such that selection of a widget configuration interface object by a user triggers the creation of a widget configuration item selection request.

The term "widget configuration item selection request" refers to an electrically generated digital object that indicates that a user has provided an input comprising a request to select a widget configuration item to be associated with a selected widget component of an object page template. A widget configuration item selection request may be represented via a temporary code that notifies a recipient (e.g., a server) that a user has made the request. To provide further context, a widget configuration item selection request is generated in response to a user interaction with a computing device wherein a user causes the computing device to generate a widget configuration item selection request by interacting with, for example, a widget configuration interface object from a dropdown menu or a selectable icon associated with a widget configuration item.

The term "object page display request" refers to an electrically generated digital object that indicates that a user has provided an input comprising a request to display an object page interface associated with a selected object. An object page display request may be represented via a temporary code that notifies a recipient that a user has made the request. To provide further context, an object page display request is generated in response to a user interaction with a computing device wherein a user causes the computing device to generate an object page display request by interacting with, for example, an icon associated with the object or a specific object page interface actuator button rendered on a visual display of the computing device.

The term "object page interface" refers to a user interface element that is rendered to a visual display of a computing device in an asset management system and is configured to display object data associated with a selected object.

The term "object" refers to a digital representation of an enterprise asset, object or resource that may be of various object types, such as a physical asset (e.g., computer, office furniture, vehicle, real estate, etc.), a digital asset (e.g., software), a piece of data, a person (e.g., new employee), or any other tangible or intangible asset (e.g., intellectual property) that may be registered, known, or accessed by the asset management system. For example, an object may be a laptop or other IT-related item wherein object data, such as attributes, ticket information, comments, and the like, for the object is uploaded or otherwise stored in a data repository (e.g., an object data repository) accessible by the asset management system. In various embodiments, an object may refer to employees or users that are identifiable.

The term "object data" refers to a collection of data associated with and/or related to an object in an asset management system that is capable of being transmitted, received, and/or stored. In some embodiments, object data comprises an object identifier, attribute data, attachment data, object type data, location data, ticket data, comment data, history data, inbound reference data, outbound reference data, employee, start date data, function data, team member data, owner data, status, data, and any other data that may serve to describe and/or distinguish one or more objects from each other. In some embodiments, object data is generated by various components within the asset management system and/or by user input to the asset management system.

The term "object identifier" refers to one or more items of data by which an object of an asset management system may be uniquely identified. For example, an object identifier may comprise ASCII text, a pointer, a memory address, and the like.

The term "object data repository" refers to a structured data set or repository for storing one or more object data accessible by the object page configuration server. The object data repository may be a dedicated device and/or a part of a larger repository.

The term "object type" refers to a group, category, and/or classification of one or more objects with similar kinds of information. Exemplary object types include but are not limited to file system, network type (e.g., LAN, WAN, VPN), hardware type (e.g., host type or device type, client device type, computer, desktop, laptop, server type, mobile device, printer, modem), software type (e.g., application, operating system), accessory type, cloud, employee type, location, intellectual property (e.g., copyright, license type), etc.

The term "object type identifier" refers to one or more items of data by which an object type may be uniquely identified by an asset management system.

The term "version identifier" refers to one or more items of data by which a specific version of an object page interface template may be identified within an asset management system. For example, a version identifier may comprise ASCII text, a pointer, a memory address, or other unique identifier. Version identifiers are used to distinguish different versions of object page interface templates assigned the same object page interface template identifier. The version identifier for an object page interface template may be an increasing numeric number, wherein the version identifier increases with each update of the object page interface template. However, it should be understood that other configurations are possible (e.g., alphanumeric values, hashes, and/or the like). In some embodiments, the version identifier is generated and assigned by the apparatus. In other embodiments, the version identifier is generated and assigned by a client device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatus, and computer program products of the present disclosure may be embodied by any of a variety of computing devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access an asset management system 200 via a communications network 102 using client devices 101A-101N. The asset management system 200 may comprise an object page configuration server 210 in communication with at least one repository, such as object page template repository 215, widget repository 220, and/or object data repository 225. Such repository(ies) may be hosted by the object page configuration server 210 or otherwise hosted by devices in communication with the object page configuration server 210. Users may further access features or services of one or more objects 103A-103N through the asset management system 200.

The object page configuration server 210 may include circuitry, networked processors, or the like configured to perform some or all of the apparatus-based processes described herein, and may be any suitable network server and/or other type of processing device. In some embodiments, the object page configuration server 210 may determine and transmit commands and instructions for rendering one or more object page configuration interfaces and/or object page interfaces to client devices 101A-101N, using data from, for example, object page template repository 215, widget repository 220, and/or object data repository 225. In this regard, the object page configuration server 210 may be embodied by any of a variety of devices, for example, the object page configuration server 210 may be embodied as a computer or a plurality of computers. For example, the object page configuration server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the object page configuration server 210 may be located remotely from the object page template repository 215, the widget repository 220, and/or the object data repository 225, although in other embodiments, the object page configuration server 210 may comprise the object page template repository 215, the widget repository 220, and/or the object data repository 225. The object page configuration server 210 may, in some embodiments, comprise several servers or computing devices performing interconnected and/or distributed functions. Despite the many arrangements contemplated herein, the object page configuration server 210 is shown and described herein as a single computing device to avoid unnecessarily overcomplicating the disclosure.

The object page configuration server 210 can communicate with one or more client devices 101A-101N and/or one or more objects 103A-103N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols.

For instance, the networking protocol may be customized to suit the needs of the asset management system 200.

The object page template repository 215 may be stored by any suitable storage device configured to store some or all of the information described herein (e.g., memory 201 of the object page configuration server 210 or a separate memory system separate from the object page configuration server 210, such as one or more database systems, backend data servers, network databases, cloud storage devices, or the like provided by another device (e.g., online application or 3rd party provider) or an object 103A-103N), such as a Network Attached Storage (NAS) device or devices, or as a separate database server or servers. The object page template repository 215 may comprise data received from the object page configuration server 210 (e.g., via a memory 201 and/or processor(s) 202) and/or an object 103A-103N, and the corresponding storage device may thus store this data. The object page template repository 215 includes information accessed and stored by the object page configuration server 210 to facilitate the operations of the asset management system 200. For example, the object page template repository 215 may include, without limitation, user identifiers, object type identifiers, object page configuration templates, widget fields, and the like.

The widget repository 220 may be stored by any suitable storage device configured to store some or all of the information described herein (e.g., memory 201 of the object page configuration server 210 or a separate memory system separate from the object page configuration server 210, such as one or more database systems, backend data servers, network databases, cloud storage devices, or the like provided by another device (e.g., online application or 3rd party provider) or an object 103A-103N, such as a Network Attached Storage (NAS) device or devices, or as a separate database server or servers. The widget repository 220 may comprise data received from the object page configuration server 210 (e.g., via a memory 201 and/or processor(s) 202) and/or an object 103A-103N, and the corresponding storage device may thus store this data. The widget repository 220 includes information accessed and stored by the object page configuration server 210 to facilitate the operations of the asset management system 200. For example, the widget repository 220 may include, without limitation, widget configuration items, widget configuration interface objects, orientation identifiers, object type identifiers, and the like.

The object data repository 225 may be stored by any suitable storage device configured to store some or all of the information described herein (e.g., memory 201 of the object page configuration server 210 or a separate memory system separate from the object page configuration server 210, such as one or more database systems, backend data servers, network databases, cloud storage devices, or the like provided by another device (e.g., online application or 3rd party provider) or an object 103A-103N, such as a Network Attached Storage (NAS) device or devices, or as a separate database server or servers. The object data repository 225 may comprise data received from the object page configuration server 210 (e.g., via a memory 201 and/or processor(s) 202) and/or an object 103A-103N, and the corresponding storage device may thus store this data. The object data repository 225 includes information accessed and stored by the object page configuration server 210 to facilitate the operations of the asset management system 200. For example, the object data repository 225 may include, without limitation, object identifiers, object type identifiers, attribute data, attachment data, object type data, ticket data, comment data, history data, inbound reference data, outbound reference data, and the like.

The client devices 101A-101N may be implemented as any computing device as defined above. Electronic data received by the object page configuration server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the object page configuration interface to generation of an object page interface template. The depiction in FIG. 1 of "N" client devices is merely for illustration purposes. According to some embodiments, the client devices 101A-101N may be configured to display an interface on a display of the client device for viewing, creating, editing, and/or otherwise interacting with at least one object page configuration interface, which may be provided by the asset management system 200. According to further embodiments, the client devices 101A-101N may be configured to display an interface on a display of the client device for viewing at least one object page interface, which may be provided by the asset management system 200. In some embodiments, an object page interface of one client device 101A may be different from an object page interface of another client device 101N.

In embodiments where a client device 101A-101N is a mobile device, such as a smartphone or tablet, the client device 101A-101N may execute an "app" to interact with the asset management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the asset management system 200 via a web browser. As yet another example, the client devices 101A-101N may include various hardware or firmware designed to interface with the asset management system 200.

Each of objects 103A-103N is a digital representation that of an asset that may be of various object types, such as a physical asset (e.g., computer, office furniture, vehicle, real estate, etc.), a digital asset (e.g., software), a piece of data, a person (e.g., new employee), or any other tangible or intangible asset (e.g., intellectual property) that may be registered, known, or accessed by the asset management system 200. For example, an object may be a laptop or other IT-related item wherein object data, such as attributes, ticket information, comments, and the like, for the object is uploaded or otherwise stored in a data repository accessible (e.g., object data repository 225) by the asset management system 200. In one non-limiting example, an object 103A may be an employee, or the like, which is an asset of an enterprise.

Example Apparatus for Implementing Embodiments of the Present Disclosure

With reference to FIG. 2, in accordance with some example embodiments, the apparatus may be embodied by one or more computing systems, such as object page configuration server 210. The object page configuration server 210 may include various means, such as memory 201, processor 202, input/output circuitry 203, and/or communications circuitry 204. In some embodiments, object page configuration circuitry 205 may also or instead be included. The object page configuration server 210 may be configured, using one or more of the circuitry 201, 202, 203, 204, and 205, to execute the operations described above with respect to FIG. 1 and below in connection with FIGS. 3-9B.

Although the use of the term "circuitry" as used herein with respect to components 201-205 of the object page configuration server 210 are described in some cases with respect to functional limitations, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, other elements of the object page configuration server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of the object page configuration server 210. The memory 201 is non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the object page configuration server 210 to carry out various functions in accordance with example embodiments of the present disclosure. Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data (including object data), applications, templates, instructions, or the like for enabling object page configuration server 210 to carry out various functions in accordance with example embodiments of the present invention. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by object page configuration server 210 during the course of performing its functionalities.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as the object page configuration server 210. The plurality of processors may be in operative communication with each other and may be collectively configured to perform one or more functionalities of object page configuration server 210 as described herein.

In an example embodiment, the processor 202 is configured to execute instructions stored in the memory 201 or otherwise accessible to the processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed. For example, these instructions, when executed by processor 202, may cause object page configuration server 210 to perform one or more of the functionalities of object page configuration server 210 as described herein, such as those discussed in connection with FIGS. 1-9B.

In some embodiments, the object page configuration server 210 may include input/output circuitry 203 that may, in turn, be in communication with processor 202 to provide an audible, visual, mechanical, or other output to a user and/or, in some embodiments, to receive an indication of a user input. The input/output circuitry 203 may comprise a user interface (e.g., an object page configuration interface, an object page interface, etc.) and may comprise a web user interface, a mobile application, a client device, a kiosk, or the like. In some embodiments, the input/output circuitry 203 may also include a keyboard, a mouse, a joystick, a touch screen, touch areas, soft keys, hard keys, a microphone, a speaker, or other input/output mechanisms. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced, and in some embodiments (like other components discussed herein), input/output circuitry 203 may even be eliminated. Alternatively, at least some aspects of input/output circuitry 203 may be embodied on an apparatus used by a user that is in communication with object page configuration server 210. Input/output circuitry 203 may be in communication with the memory 201, communications circuitry 204, and/or any other component(s), such as via a bus. One or more input/output circuitry 203 and/or other component can be included in object page configuration server 210.

The communications circuitry 204 may be any means such as a device or circuitry embodied in either hardware or a combination of hardware and software that is configured to receive and/or transmit data from/to a network and/or any other device, circuitry, or module in communication with object page configuration server 210. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the object page configuration server 210 using any of a number of wireless personal area network (PAN) technologies, such as Bluetooth® v1.0 through v3.0, Bluetooth® Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of object page configuration server, such as via a bus.

The object page configuration circuitry 205 includes hardware components and/or software configured to support object page configuration-related functionality, features, and/or services of the object page configuration server 210. The object page configuration circuitry 205 may utilize processing circuitry, such as the processor 202, to perform its corresponding operations, and may utilize memory 201 to store collected information. The object page configuration circuitry 205 may send and/or receive data from object page template repository 215, widget repository 220, and/or object data repository 225. In some implementations, the sent and/or received data may include user identifier(s), object page configuration interface template(s), object type(s), object data, and associated data that is configured for association with one or more object page configuration interface templates. It should also be appreciated that, in some embodiments, the object page configuration circuitry 205 may include a separate processor, specially configured field programmable gate array (FPGA), or application specific interface circuit (ASIC) to perform its corresponding functions.

It is also noted that all or some of the information discussed herein can be based on data that is received, generated and/or maintained by one or more components of the object page configuration server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of object page configuration server 210.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In various embodiments of the present disclosure, an apparatus (e.g., object page configuration server 210) is configured to manage an object page configuration interface of an asset management system. FIG. 3 illustrates an example object page configuration interface 300 structured in accordance with various embodiments of the subject disclosure. The depicted object page configuration interface 300 presents a horizontal widget selection interface 301 and a vertical widget selection interface 302. The depicted object page configuration interface 300 optionally presents an object type selection interface 303 as described herein. In certain embodiments, the user is provided with instructions on using the object page configuration interface 300 to configure or customize the layout, structure, and/or object information to be visually represented in an object page interface of the asset management system.

In some embodiments, the apparatus causes rendering of the object page configuration interface 300 to a visual display of a computing device (e.g., a client device 101A-101N) in response to receiving an object page configuration request. In some embodiments, the user accesses the object page configuration interface 300 by verbal command, gesture, on-screen dynamics (e.g., soft key), or other types of input indications that may facilitate generating an object page configuration request at the computing device. In one embodiment, a "Configure" icon, actuator button, or other executable interface element is rendered to an interface of the computing device that, when selected by the user, causes the computing device to generate and transmit an object page configuration request to the apparatus. For example, in response to the user clicking or activating the "Configure" actuator button, the computing device generates and transmits a temporary code representative of an object page configuration request to the object page configuration server 210. In response to the receipt of the object page configuration request by the object page configuration server 210, the object page configuration interface 300 is displayed. In other embodiments, an executable interface element corresponding to the object page configuration request is accessible via a drop-down menu rendered to the interface. Such examples, however, are for purposes of illustration and not of limitation and other suitable variations of facilitating the generation of an object page configuration request are also contemplated by this disclosure as will be apparent to one of ordinary skill in the art.

In some embodiments, the object page configuration request comprises a unique user identifier associated with the user. In some embodiments, a client device 101A-101N may receive or access the user identifier. For example, the user identifier may be received remotely, via wireless communication or tethered communication, or directly, via input into one of the client devices 101A-101N. In some embodiments, the user may have a remote device, such as a mobile device or key fob that interacts with the client devices 101A-101N to transmit an user identifier and/or other related user data to authenticate the user. In another example, a user may simply provide login credentials through the interface of their client device 101A-101N. The client device 101A-101N then transfers the unique user identifier to the apparatus (e.g., the object page configuration server 210) as part of or in addition to the object page configuration request. In still further embodiments, the object page configuration request comprises an object type identifier associated with a selected object type. In a non-limiting example, a "Configure" actuator button or drop-down menu selected by a user may be associated with a selected object type.

Returning to FIG. 3, the depicted object page configuration interface 300 presents a horizontal widget selection interface 301. The horizontal widget selection interface 301 is rendered as a "pane" (e.g., a main pane) or configurable portion of the object page configuration interface 300, the horizontal widget selection interface 301 configured to enable a user to view and interact with the interface in order to select one or more widget components to be rendered in a horizontal arrangement in an object page template and/or an object page interface. For instance, in some embodiments, the user indicates a desire to add and/or configure a horizontal widget component by selecting a "+" icon, actuator button, or other executable interface element 304 rendered to the horizontal widget selection interface 301. In certain embodiments, such selection or interaction causes the horizontal widget selection interface 301 to present the user with specific widget component options. For example, in the embodiment illustrated in FIG. 4, the horizontal widget selection interface 401 depicts seven exemplary available widget components (e.g., Attachments, Attributes, Comments, Connected Tickets, History, Inbound References, IQL query) in a drop-down menu. In some embodiments, the apparatus causes rendering of the specific widget component options to the horizontal widget selection interface 401 in response to receiving a widget component option request (e.g., in response to the user selecting the "+" actuator button, the client device 101A-101N generates and transmits a temporary code representative of a widget component option request to the object page configuration server 210). The user can then indicate a desire to add and/or configure a particular horizontal widget component by selecting a widget component from the drop-down menu.

Additionally or alternatively, the user indicates a desire to add and/or configure a horizontal widget component by selecting or interacting with a checkbox interface element associated with a widget component. In certain embodiments, interaction with a selected checkbox interface element causes the horizontal widget selection interface 301 to present or not present the user with the widget component associated with the checkbox interface element 305, 306. For example, in the embodiment illustrated in FIG. 3, a checkbox interface element 305 associated with an attachments widget component and a checkbox interface element 306 associated with a comment widget component are depicted. The user indicates a desire for the attachments widget component and/or the comment widget component to be made available in the horizontal widget content interface component of the object page interface template (and the associated horizontal widget component of the object page interface) by "checking" the checkbox interface element 305, 306 associated with the respective widget component. The user indicates a desire for the attachments widget component and/or the comment widget component to not be made available in the horizontal widget content interface component of the object page interface template by "unchecking" the checkbox interface element 305, 306 associated with the respective widget component. In some embodiments, the checkbox interface element(s) 305, 306 is rendered to the horizontal widget selection interface 301, 401. In other embodiments, the checkbox interface element(s) 305, 306 is rendered to a separate selection interface associated with the horizontal widget selection interface 301, 401.

Returning to FIG. 3, the depicted object page configuration interface 300 further presents a vertical widget selection interface 302. Similar to the horizontal widget selection interface 301, the vertical widget selection interface 302 is rendered as a "pane" (e.g., a sidebar pane) or configurable portion of the object page configuration interface 300, however, the vertical widget selection interface 302 is configured to enable a user to view and interact with the interface in order to select one or more widget components to be rendered in a vertical arrangement in an object page template and/or an object page interface. For instance, in some embodiments, the user indicates a desire to add and/or configure a vertical widget component by selecting an "+ Add panel" icon, actuator button, or other executable interface element 307 rendered to the vertical widget selection interface 302. In certain embodiments, such selection or interaction causes the vertical widget selection interface 302 to present the user with specific widget component options. For example, in the embodiment illustrated in FIG. 5, the vertical widget selection interface 502 depicts seven exemplary available widget components (e.g., Attachments, Attributes, Comments, Connected Tickets, History, Inbound References, IQL query) in a drop-down menu. In some embodiments, the apparatus causes rendering of the specific widget component options to the vertical widget selection interface 502 in response to receiving a widget component option request (e.g., in response to the user selecting the "+ Add panel" actuator button, the client device 101A-101N generates and transmits a temporary code representative of a widget component option request to the object page configuration server 210). The user can then indicate a desire to add and/or configure a particular vertical widget component by selecting a widget component from the drop-down menu.

Additionally or alternatively, although not depicted, in some embodiments, the user indicates a desire to add and/or configure a vertical widget component by selecting or interacting with a checkbox interface element associated with a vertical widget component. In certain embodiments, interaction with a selected checkbox interface element causes the vertical widget selection interface 502 to present or not present the user with the widget component associated with the checkbox interface element. The user indicates a desire for a selected widget component to be made or not to be made available in the vertical widget content interface component of an object page interface template by "checking" or "unchecking", respectively, the checkbox interface element associated with the selected widget component.

Returning to FIG. 3, the depicted object page configuration interface 300 optionally presents an object type selection interface 303. The object type selection interface 303 is rendered as a configurable portion of the object page configuration interface 300, the object type selection interface 303 configured to enable a user to view and interact with the interface in order to select an object type to be associated with the object page template to be generated. Exemplary object types include but are not limited to file system, network (e.g., LAN, WAN, VPN), hardware (e.g., host device, client device, computer, desktop, laptop, server, mobile device, printer, modem), software (e.g., application, operating system), accessory, cloud, employee, location, intellectual property (e.g., copyright, license), etc. In a non-limiting example, a drop-down menu or an otherwise executable interface element associated with respective available object types is rendered to the object type selection interface 303 and selected by a user, thereby causing the client device 101A-101N to generate an object type selection request, the object type selection request comprising an object type identifier associated with the selected object type. In some embodiments, the client device 101A-101N transmits the object type selection request comprising the object type identifier to the apparatus (e.g., object page configuration server 210) in response to such user interaction with the object type selection interface 303.

In some embodiments, the horizontal widget selection interface 301 and/or the vertical widget selection interface 302 are configured to enable a user to remove or delete a selected widget component from the respective selection interface 301, 302 such that the selected widget component is not rendered in the specified orientation (e.g., a horizontal arrangement or vertical arrangement) in an object page template and/or an object page interface. For instance, in some embodiments, the user indicates a desire to remove or delete a horizontal widget component by selecting a trash can icon, a "Remove Tab" actuator button, or other executable interface element 308 rendered to the horizontal widget selection interface 301. Similarly, in some embodiments, the user indicates a desire to remove or delete a vertical widget component by selecting a trash can icon, a "Remove Tab" actuator button, or other executable interface element 309 rendered to the vertical widget selection interface 302. In certain embodiments, such selection or interaction causes a delete confirmation component to be rendered to the object page configuration interface. The delete confirmation component is configured to allow the user to confirm deletion of the selected widget component by further selecting or interacting with a, for example, "delete" or "confirm" actuator button or to cancel deletion of the selected widget component by further selecting or interacting with, for example, a "cancel" actuator button. In response to a selection by the user, a respective delete confirmation request or cancel delete request is generated and transmitted to the object page configuration server 210.

The rendering of the widget components (e.g., widget content components) may be ordered in a myriad of ways. In one embodiment, the object page configuration server 210 causes ordering of the display of the widget components based on the alphabetical sequence of the widget component titles. In other embodiments, the display of the widget components is ordered based on a predefined sequence or hierarchy of the widget components. In some embodiments, the horizontal widget selection interface and/or the vertical widget selection interface are configured to enable a user to reorder the respective widget components to be rendered in the specified orientation (e.g., a horizontal arrangement or vertical arrangement) in an object page template and/or an object page interface. For example, in some instances, the user indicates a desire to reorder a horizontal widget component by selecting a horizontal widget component and moving the selected widget component to a position of choice in the horizontal arrangement of widget components to be displayed. For example, the user may define a "drag and drop" of the selected widget component by clicking on the widget component in a first point of the horizontal arrangement of widget components and continuously moving the selected widget component to a second point in a different region of the horizontal arrangement of widget components. Similarly, in some embodiments, the user indicates a desire to reorder a vertical widget component by selecting a vertical widget component and moving the selected widget component to a position of choice in the vertical arrangement of widget components to be displayed.

In still further embodiments, the user can indicate a desire to rename or retitle a widget component by, for example, double-clicking on the name component (e.g., title) of a selected widget component. Upon detection of or receipt of an indication of such double-clicking of the name component associated with a selected widget component, the apparatus causes rendering of a text input interface component. The text input interface component is configured for user entry of a user-defined widget title component. The user-defined widget title component can be transmitted to the object page configuration server 210 and stored in association with a selected object page interface template.

In some embodiments, the apparatus (e.g., object page configuration server 210) receives one or more horizontal widget selection requests in response to user interaction with the horizontal widget selection interface 301. Similarly, in some embodiments, the apparatus (e.g., object page configuration server 210) receives one or more vertical widget selection requests in response to user interaction with the vertical widget selection interface 302. For example, in some embodiments, a widget selection request is generated by the client device 101A-101N and transmitted to the object page configuration server 210 each time the user adds, removes, reorders, renames, and/or otherwise interacts with the respective widget selection interface 301, 302 to configure a widget component, such that the user experiences passively saved changes or modifications.

Additionally or alternatively, in some embodiments, a widget selection request is generated by the client device 101A-101N each time the user adds, removes, reorders, renames, and/or otherwise interacts with the respective widget selection interface 301, 302 to configure a widget component, however, the widget selection request(s) are only transmitted to the object page configuration server 210 upon a further affirmative selection by the user. For example, in some embodiments, a client session is initiated by or on the client device in association with the object page configuration request in order to capture any modifications or changes (e.g., additions, deletions, reordering, renaming, etc.) detected in association with a widget selection interface and causes a "Save changes" or "Save" icon, actuator button, or other executable interface element 310 to be rendered to and/or further emphasized in the object page configuration interface 300 in response to such detections. In association with detecting an interaction with the "Save changes" or "Save" icon, actuator button, or other executable interface element 310 associated with authorizing changes or modifications, the client device transmits all captured widget selection request(s) associated with the detected changes or modifications to the apparatus. In still further embodiments, if no interaction with the "Save changes" or "Save" icon, actuator button, or other executable interface element 310 is detected, the client device does not transmit such captured widget selection request(s) to the apparatus. In some embodiments, the apparatus is further configured to cause a save changes confirmation interface 600 comprising a save changes confirmation component (e.g., "Confirm" actuator button) 601 to be rendered to the object page configuration interface 300, as depicted in the exemplary embodiment illustrated in FIG. 6.

In still further embodiments, instead of transmitting widget selection request(s) associated with each individual change in response to detecting an interaction with the "Save changes" or "Save" icon, actuator button, or other executable interface element 310 associated with authorizing changes or modifications, the client device 101A-101N generates and transmits to the apparatus a modified and/or updated copy of an object page interface template incorporating such changes. For example, in some embodiments, in response to receiving an object page configuration request, the apparatus transmits a base object page interface template to the client device 101A-101N in association with the object page configuration interface. Any modifications or changes (e.g., additions, deletions, reordering, renaming, etc.) detected in association with such object page configuration interface are captured in a modified object page interface template (i.e., a modified and/or updated copy of the base object page interface template). In still further embodiments, the modified object page interface template is transmitted to the apparatus, the apparatus receives the modified object page interface template, and the apparatus performs a comparison of the original base object page interface template to the modified object page interface template to determine or identify any modifications or changes. In some embodiments, the apparatus transmits a list or summary of such detected modifications or changes detected to the client device 101A-101N for rendering to the visual display. In some embodiments, the apparatus is further configured to cause a save changes confirmation interface 600 comprising a save changes confirmation component (e.g., "Confirm" actuator button) 601 to be rendered to the object page configuration interface 300, as depicted in the exemplary embodiment illustrated in FIG. 6.

In some embodiments, each of the widget selection requests received by the apparatus comprises a widget component identifier. For example, each of the horizontal widget selection requests and each of the vertical widget selection requests further comprises a widget component identifier. A widget component identifier is one or more items of data by which a widget component is uniquely identified in the asset management system 200. For example, in some embodiments, a widget component identifier comprises an attributes widget component identifier such that it corresponds to an attributes widget component (e.g., as depicted in FIG. 3). In still further embodiments, the widget component identifier corresponds to a connected tickets widget component, a comments widget component, an attachments widget component, a references widget component, an object history widget component, or a query widget component. In some embodiments, the widget component identifier is generated at the client device 101A-101N by the user's selection of the selected widget component and is transmitted as part of, or in association with, the respective widget selection request to the object page configuration server 210.

In still further embodiments, the apparatus retrieves one or more widget configuration items based upon at least one or more data points. Exemplary data points include, but are not limited to, a widget component identifier, a user identifier, an orientation identifier, an object type, and/or a user role. For example, in some embodiments, the apparatus queries a repository, such as widget repository 220, using the received widget component identifier(s) and retrieves such widget configuration items returned by the query. In a non-limiting example, the apparatus retrieves one or more widget configuration items based upon at least an attributes widget component identifier received in association with a first horizontal widget selection request. In another non-limiting example, the apparatus retrieves one or more widget configuration items based upon at least a connected tickets widget component identifier received in association with a second horizontal widget selection request. In some embodiments, one or more of the available widget configuration items associated with a first widget component differ from one or more of the available widget configuration items associated with a second widget component. For instance, the available widget configuration items associated with an attributes widget component may differ from the available widget configuration items associated with a connected tickets widget component. In another example, the available widget configuration items associated with a horizontal attributes widget component may differ from the available widget configuration items associated with a vertical attributes widget component. In still another example, one or more of the available widget configuration items associated with a first widget component are the same as one or more of the available widget configuration items associated with a second widget component. For instance, in some embodiments, the "Load content only when visible" widget configuration item is associated with multiple widget components, although the value of the "Load content only when visible" widget configuration item can be the same or different for each widget component.

In some embodiments, the apparatus causes rendering of a widget configuration interface to the selected or corresponding widget selection interface 301, 302 of the object page configuration interface 300 based upon the retrieved one or more widget configuration items, the widget configuration interface presenting available settings and options to optionally allow for user configuration of a selected widget component. For instance, in a non-limiting example, the apparatus receives a vertical widget selection request in response to user interaction with the vertical widget selection interface 302, the vertical widget selection request comprising a history widget component identifier. After retrieval of one or more widget configuration items from the widget repository based upon the received history widget component identifier, the apparatus causes rendering of a history widget configuration interface to the vertical widget selection interface 302.

FIGS. 7A-7G illustrate example widget configuration interfaces structured in accordance with various embodiments of the subject disclosure. For instance, FIG. 7A illustrates an attributes widget configuration interface 701, FIG. 7B illustrates a connected tickets widget configuration interface 702, FIG. 7C illustrates a comments widget configuration interface 703, FIG. 7D illustrates an attachments widget configuration interface 704, FIG. 7E illustrates an inbound references widget configuration interface 705, FIG. 7F illustrates a history widget configuration interface 706, and FIG. 7G illustrates a query widget configuration interface 707.

In some embodiments, the widget configuration interface comprises widget configuration interface objects wherein each of the widget configuration interface objects is based upon (e.g., corresponds to) a retrieved widget configuration item. For example, FIG. 7F illustrates a per page item number setting configuration interface object 710 (i.e., "Number of items per page") which corresponds to a retrieved per page item number setting configuration item associated with the history widget component identifier.

In some embodiments, the apparatus (e.g., object page configuration server 210) further receives one or more widget configuration item selection requests in response to user interaction with the widget configuration interface. For example, in some embodiments, a widget configuration item selection request is generated by the client device 101A-101N and transmitted to the object page configuration server 210 (e.g., via temporary code) in response to the user configuring (e.g., adding, selecting, adjusting, modifying, deleting, defining, etc.) a widget configuration item. For instance, in a non-limiting example exemplified by FIG. 7A, an attributes widget configuration item selection request is generated when a user adds one or more attributes to display in a list format in the attributes widget configuration interface 701. An attribute represents one or more pieces of information about an object. In another non-limiting example exemplified by FIG. 7A, an attributes widget configuration item selection request is generated when a user deletes one or more attributes from the list format in the attributes widget configuration interface 701. In another non-limiting example exemplified by FIG. 7C, a comments widget configuration item selection request is generated when a user toggles the widget configuration interface object 715 associated with "Display the editor" configuration item indicating the user's desire for an editor component to be displayed in association with the comments widget component in a corresponding object page interface of a selected object 103A-103N when generated by an object page interface template.

In some embodiments, the apparatus (e.g., object page configuration server 210) generates an object page interface template. The object page interface template provides the format, layout, organization, structure, arrangement, and/or display of content and/or information used to render an object page interface of a selected object 103A-103N in the asset management system 200. In some embodiments, the object page interface template comprises at least one horizontal widget content interface component comprising the arrangement of one or more horizontal widget components in the object page interface template based at least in part on the received horizontal widget selection request(s). Similarly, in some embodiments, the object page interface template comprises at least one vertical widget content interface component comprising the arrangement of one or more vertical widget components in the object page interface template based at least in part on the received vertical widget selection request(s). Accordingly, such arrangement(s) of widget components correspond to the selection, addition, deletion, renaming, reordering, etc. of the widget components by the user as described herein. In some embodiments, the apparatus generates an object page interface template based at least upon the received widget selection requests and further based on one or more widget configuration item selection requests.

In some embodiments, the apparatus (e.g., object page configuration server 210) causes storage of the generated object page interface template in an object page template repository 215. In still further embodiments, the object page configuration server 210 causes storage of the generated object page interface template in association with one or more identifiers. For example, in some embodiments, the object page configuration request comprises a unique user identifier associated with the user and the object page configuration server 210 causes storage of the generated object page interface template in association with the received user identifier. In some embodiments, the object page template repository comprises a plurality of such user-generated object page interface templates, each of the object page interface templates associated with a user identifier such that the object page interface templates are configured to generate an object page interface differently based on the specific user and may present object page interfaces differently based on the particular object interface template (e.g., present different object page interfaces to different users). In still further embodiments, the apparatus causes storage of the generated object page interface template to the object page template repository in association with a received object type identifier as described herein.

In some embodiments, causing storage of a generated object page interface template in the object page template repository 215 comprises overwriting any prior versions or copies of the selected object page interface template previously stored in the object page template repository 215 (e.g., a prior version of a selected object page interface template associated with the same unique object page interface template identifier). In another embodiment, causing storage of a generated object page interface template in the object page template repository 215 comprises assigning a new version identifier with each version of a generated object page interface template (e.g., a new version of a selected object page interface template associated with the same unique object page interface template identifier) and storing the version identifier in association with the generated object page interface template in the object page template repository 215.

In still further embodiments, the apparatus (e.g., object page configuration server 210) is configured to receive an object page display request. For example, in response to a user clicking or activating an icon or actuator button associated with an object 103A-103N, the client device 101A-101N generates and transmits a temporary code representative of the object page display request to the object page configuration server 210. In some embodiments, the object page display request comprises a user identifier associated the user and an object identifier associated with the selected object 103A-103N.

In some embodiments, the apparatus is configured to retrieve a generated object page interface template associated with the received user identifier from the object page template repository 215. For example, in some embodiments, the apparatus queries the object page template repository 215, using the received user identifier and retrieves the generated object page interface template returned by the query.

In still further embodiments, the apparatus is configured to retrieve object data associated with the object identifier from an object data repository 225 and transmit such object data to the client device associated with the object page display request. For example, in some embodiments, the apparatus is configured to query a repository, such as the object data repository 225, using the object identifier and retrieve the object data returned by the query (e.g., the object data corresponding to the object identifier). In some embodiments, the client device filters the received object data in association with the corresponding object page interface template to display only the selected object data associated with the object page interface template. For example, in certain embodiments, the object page interface template comprises widget fields programmatically generated based on the received widget selection requests and/or widget configuration item selection requests. By way of example, in response to a user selecting to display the "Status" attribute in association with the horizontal attributes widget component (e.g., adding the "status" attribute configuration item in the horizontal attributes widget configuration interface 701 depicted in FIG. 7A), the corresponding object page interface template comprises a "Status" attribute widget field in association with the horizontal attributes widget content interface component. In another non-limiting example, in response to a user selecting to display 15 items per page in association with the horizontal connected tickets widget component (e.g., entering "15" in association with the per page item number setting configuration interface in the horizontal connected tickets widget configuration interface 702 depicted in FIG. 7B), the corresponding object page interface template comprises 15 widget fields per page in association with the horizontal connected tickets widget content interface component.

In still further embodiments, the apparatus is configured to retrieve only a subset of object data associated with the object identifier and the generated object page interface template from an object data repository 225. In some embodiments, the apparatus is configured to query a repository, such as the object data repository 225, using the object identifier and the object page interface template (e.g., the programmatically generated widget fields) and retrieve the subset of object data returned by the query (e.g., the subset of object data corresponding to the object identifier and the widget fields). For example, in some embodiments, the apparatus advantageously retrieves a smaller subset of data compared to the entirety of object data associated with the selected object 103A-103N as a result of reduced widget field requirements, thereby reducing network traffic and data processing requirements by the client device, resulting in less strain on the asset management system and leading to increased lifetime and efficiency of the asset management system. Such embodiments also increase security of the object data as only relevant object data is transmitted to the client device.

In some embodiments, the apparatus is configured to dynamically instantiate the generated object page interface template with the retrieved object data or subset of object data. For example, in certain embodiments, the object page interface template comprises widget fields programmatically generated based on the received widget selection requests and/or widget configuration item selection requests. For example, in response to a user selecting to display the "Status" attribute in association with the horizontal attributes widget component (e.g., adding the "status" attribute configuration item in the horizontal attributes widget configuration interface 701 depicted in FIG. 7A), the corresponding object page interface template comprises a "Status" attribute widget field in association with the horizontal attributes widget content interface component. In another non-limiting example, in response to a user selecting to display 15 items per page in association with the horizontal connected tickets widget component (e.g., entering "15" in association with the per page item number setting configuration interface in the horizontal connected tickets widget configuration interface 702 depicted in FIG. 7B), the corresponding object page interface template comprises 15 widget fields per page in association with the horizontal connected tickets widget content interface component.

In some embodiments, dynamically instantiating the generated object page interface template with the retrieved subset of object data comprises programmatically mapping the retrieved object data or subset of object data to one or more of the particular widget fields in the generated object page interface template. In some embodiments, the apparatus programmatically maps the retrieved subset of object data by populating the corresponding data to the related widget fields in the object page interface template. For instance, in a non-limiting example, the apparatus populates the corresponding object status data for the selected object 103A-103N to the "Status" attribute widget field in association with the horizontal attributes widget content interface component. In another non-limiting example, the apparatus populates the corresponding ticket item object data for the selected object 103A-103N to 15 widget fields per page in association with the horizontal connected tickets widget content interface component.

In some embodiments, the apparatus is configured to cause rendering of the dynamic instantiation of the generated object page configuration interface template to an object page interface. For example, the horizontal widget component(s) are rendered in a horizontal format or position in relation to one another and the vertical widget component(s) are rendered in a vertical format or position in relation to one another to the object page interface for the selected object 103A-103N. In some embodiments, each of the horizontal widget component(s) is rendered in a reduced format (e.g., tab displaying widget component title without display of widget component content in accordance with object interface template) unless the horizontal widget component is selected such that the horizontal widget component is rendered in an expanded format (e.g., horizontal panel displaying widget component title with display of widget component content in accordance with object interface template). Similarly, in some embodiments, each of the vertical widget component(s) is rendered in a reduced format (e.g., tab displaying widget component title without display of widget component content in accordance with object interface template) unless the vertical widget component is selected such that the vertical widget component is rendered in an expanded format (e.g., vertical panel displaying widget component title with display of widget component content in accordance with object interface template).

Example Operations Performed

Having described the apparatus, system, and exemplary circuitry comprising embodiments of the present disclosure, it should be understood that the apparatus may proceed to manage object page configuration interfaces of an asset management system in a number of ways. FIG. 8A is a flowchart broadly illustrating a series of operations or process blocks that are executed or performed to generate and store an object page interface template in an asset management system in accordance with in accordance with some example embodiments of the present disclosure. The operations illustrated in FIG. 8A may, for example, be performed by, with the assistance of, and/or under the control of an apparatus (e.g., object page configuration server 210), as described above. In this regard, performance of the operations may invoke one or more of memory 201, processor 202, input/output circuitry 203, communications circuitry 204, and/or object page configuration circuitry 205.

In the embodiment illustrated in FIG. 8A, the flowchart illustrates method 800 which includes receiving an object page configuration request comprising a first user identifier associated with a first user at Block 802. For example, the object page configuration server 210 may include means, such as the processor 202, communications circuitry 204, object page configuration circuitry 205, or the like, for receiving the object page configuration request.

As shown in Block 804, in some embodiments, the object page configuration server 210 includes means, such as the processor 202, input/output circuitry 203, communications circuitry 204, object page configuration circuitry 205, or the like, to cause rendering of an object page configuration interface to a visual display of a computing device (e.g., a client device 101A-101N) in response to receiving the object page configuration request. An object page configuration interface 300 comprising a horizontal widget selection interface 301 and a vertical widget selection interface 302 as shown in FIG. 3 is one example of such rendering.

At Block 806, the method 800 further includes receiving one or more horizontal widget selection requests in response to user interaction with the horizontal widget selection interface. For example, the object page configuration server 210 may include means, such as the processor 202, communications circuitry 204, object page configuration circuitry 205, or the like, for receiving such horizontal widget selection requests. In some embodiments, the one or more horizontal widget selection requests each comprise a horizontal widget component identifier.

As illustrated at Block 808, in some embodiments, method 800 may further include retrieving one or more widget configuration items from a repository, such as widget repository 220 based upon at least the received horizontal widget component identifiers. For example, the object page configuration server 210 may include means, such as the processor 202, communications circuitry 204, object page configuration circuitry 205, or the like, for retrieving such one or more widget configuration items. As described herein, in some embodiments, the present disclosure also contemplates retrieving or filtering the available widget configuration items based upon other identifiers or data points, such as object type, user role, orientation identifier, etc.

As illustrated at Blocks 810 and 812, in some embodiments, the object page configuration server 210 may further include means, such as the processor 202, input/output circuitry 203, communications circuitry 204, object page configuration circuitry 205, or the like, to cause rendering of a widget configuration interface to the object page configuration interface (e.g., the horizontal widget selection interface) and receiving one or more widget configuration item selection requests, respectively.

At Block 814, the method 800 further includes receiving one or more vertical widget selection requests in response to user interaction with the vertical widget selection interface. For example, the object page configuration server 210 may include means, such as the processor 202, communications circuitry 204, object page configuration circuitry 205, or the like, for receiving such vertical widget selection requests. In some embodiments, the one or more vertical widget selection requests each comprise a vertical widget component identifier.

As illustrated at Block 816, in some embodiments, method 800 may further include retrieving one or more widget configuration items from a repository, such as widget repository 220, based upon at least the received vertical widget component identifiers. For example, the object page configuration server 210 may include means, such as the processor 202, communications circuitry 204, object page configuration circuitry 205, or the like, for retrieving such one or more widget configuration items. As described herein, in some embodiments, the present disclosure also contemplates retrieving or filtering the available widget configuration items based upon other identifiers or data points, such as object type, user role, orientation identifier, etc.

As illustrated at Blocks 818 and 820, in some embodiments, the object page configuration server 210 may further include means, such as the processor 202, input/output circuitry 203, communications circuitry 204, object page configuration circuitry 205, or the like, to cause rendering of a widget configuration interface to the object page configuration interface (e.g., the vertical widget selection interface) and receiving one or more widget configuration item selection requests, respectively.

At Block 822, the object page configuration server 210 may further include means, such as the processor 202, object page configuration circuitry 205, or the like, to generate an object page interface template based at least in part on the received widget selection requests, the object page interface template comprising at least one horizontal widget content interface component and at least one vertical widget content interface component.

At Block 824, the object page configuration server 210 may further include means, such as the processor 202, object page configuration circuitry 205, or the like, to cause storage of the generated object page interface template in association with the first user identifier in an object page template repository. As described herein, in some embodiments, the present disclosure also contemplates storing the generated object page interface template in association with an object type identifier.

FIG. 8B is a signal diagram of an example data flow represented by method 800. That is, FIG. 8B illustrates an example signal diagram illustrating data flow interactions between an object page configuration server, two repositories, and a client device when managing an object page configuration interface in accordance with one embodiment. Method 800 is described as being performed by a client device 101A, an object page configuration server 210, and object page template repository 215, and a widget repository 220. These may be similar to those previously discussed with regards to FIG. 1.

Turning to FIG. 9A, FIG. 9A is a flowchart broadly illustrating a series of operations or process blocks that are executed or performed to dynamically instantiate an object page configuration interface template to an object page interface in association with a selected object in an asset management system 200 in accordance with in accordance with some example additional embodiments of the present disclosure. The operations illustrated in FIG. 9A may, for example, be performed by, with the assistance of, and/or under the control of an apparatus (e.g., object page configuration server 210), as described above. In this regard, performance of the operations may invoke one or more of memory 201, processor 202, input/output circuitry 203, communications circuitry 204, and/or object page configuration circuitry 205.

In the embodiment illustrated in FIG. 9A, the flowchart illustrates method 900 which includes receiving an object page display request comprising the first user identifier and an object identifier at Block 902. For example, the object page configuration server 210 may include means, such as the processor 202, communications circuitry 204, object page configuration circuitry 205, or the like, for receiving the object page display request.

As illustrated at Blocks 904 and 906, in some embodiments, method 900 includes retrieving the generated object page interface template associated with the first user identifier from the object page template repository and retrieving a subset of object data associated with the object identifier and the generated object page interface template from an object data repository, respectively. For example, the object page configuration server 210 may include means, such as the processor 202, communications circuitry 204, object page configuration circuitry 205, or the like, for retrieving such generated object page interface template and subset of object data.

At Block 908, the object page configuration server 210 further includes means, such as the processor 202, object page configuration circuitry 205, or the like, for dynamically instantiating the generated object page interface template with the retrieved subset of object data by programmatically mapping the subset of object data to one or more particular widget fields in the generated object page interface template. As described herein, in some embodiments, the present disclosure contemplates the object page interface template comprises widget fields programmatically generated based on the received widget selection requests and/or widget configuration item selection requests.

Block 910, the object page configuration server 210 further includes means, such as the processor 202, input/output circuitry 203, object page configuration circuitry 205, or the like, for cause rendering of the dynamic instantiation of the generated object page configuration interface template to an object page interface on the visual display of the computing device (e.g., client device 101A associated with the first user identifier).

FIG. 9B is a signal diagram of an example data flow represented by method 900. That is, FIG. 9B illustrates an example signal diagram illustrating data flow interactions between an object page configuration server, two repositories, and a client device when managing an object page configuration interface in accordance with one embodiment. Method 900 is described as being performed by a client device 101A, an object page configuration server 210, an object page template repository 215, and an object data repository 225. These may be similar to those previously discussed with regards to FIG. 1.

FIGS. 8A, 8B, 9A, and 9B thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the object page configuration server 210 and executed by a processor 202 of the object page configuration server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to manage an object page configuration interface of an asset management system, the apparatus comprising at least one processor and at least one memory, the at least one memory having computer-coded instructions therein, wherein the computer-coded instructions are configured to, in execution with the at least one processor, cause the apparatus to:
    receive an object page configuration request comprising a selected object type identifier and a first user identifier associated with a first user;
    cause rendering of an object page configuration interface to a visual display of a computing device in response to receiving the object page configuration request,
    wherein the object page configuration interface comprises a horizontal widget selection interface and wherein the horizontal widget selection interface comprises one or more widget components configured to be rendered in a horizontal arrangement, each horizontal widget component being configurable to define and visually organize a first object data subset to be displayed in correlation to a selected object,
    wherein the object page configuration interface comprises a vertical widget selection interface and wherein the vertical widget selection interface comprises one or more widget components configured to be rendered in a vertical arrangement, each vertical widget component being configurable to define and visually organize a second object data subset to be displayed in correlation to a selected object,
    wherein the horizontal widget selection interface is distinct and separate from the vertical widget selection interface,
    wherein the first object data subset is different than the second object data subset; and
    wherein each of the selection interfaces is concurrently displayed to the object page configuration interface;
    receive one or more horizontal widget selection requests in response to user interaction with the horizontal widget selection interface;
    receive one or more vertical widget selection requests in response to user interaction with the vertical widget selection interface;
    generate an object page interface template based at least in part on the received widget selection requests, wherein the object page interface template comprises at least one horizontal widget content interface component and at least one vertical widget content interface component, and wherein a dynamic instantiation of the object page interface template generates an object page interface; and
    cause storage of the generated object page interface template in association with the first user identifier and the selected object type identifier in an object page template repository.

2. The apparatus of claim 1, wherein the object page template repository comprises a plurality of user-generated object page interface templates, each of the user-generated object page interface templates associated with a user identifier.

3. The apparatus of claim 1, wherein each of the received widget selection requests comprises a widget component identifier.

4. The apparatus of claim 3, wherein the computer-coded instructions are further configured to cause the apparatus to:
    retrieve one or more widget configuration items based upon at least the received widget component identifiers;
    cause rendering of a widget configuration interface to the object page configuration interface based upon the retrieved one or more widget configuration items;
    receive one or more widget configuration item selection requests in response to user interaction with the widget configuration interface; and
    generate the object page interface template based at least upon the received widget selection requests and the received widget configuration item selection requests.

5. The apparatus of claim 4, wherein the object page configuration request comprises the first user identifier and an object type and wherein the computer-coded instructions are further configured to cause the apparatus to:
    retrieve widget configuration items based upon at least the received widget component identifiers and the object type.

6. The apparatus of claim 4, wherein each of the one or more horizontal widget selection requests comprises a horizontal orientation identifier and each of the one or more vertical widget selection requests comprises a vertical orientation identifier.

7. The apparatus of claim 6, wherein the computer-coded instructions are further configured to cause the apparatus to:
retrieve subsets of available widget configuration items based upon at least the received widget component identifiers and the associated orientation identifiers, such that a first subset of available widget configuration items corresponding to a first widget component identifier and a horizontal orientation identifier differs from a second subset of available widget configuration items corresponding to the first widget component identifier and a vertical orientation identifier.

8. The apparatus of claim 4, wherein the computer-coded instructions are further configured to cause the apparatus to:
retrieve widget configuration items based upon at least the received widget component identifiers and a user role associated with the first user identifier.

9. The apparatus of claim 3, wherein each of the widget component identifiers corresponds to an attributes widget component, a connected tickets widget component, a comments widget component, an attachments widget component, a references widget component, an object history widget component, or a query widget component.

10. The apparatus of claim 1, wherein the computer-coded instructions are further configured to cause the apparatus to:
receive an object page display request comprising the first user identifier and an object identifier, wherein the object identifier is associated with the selected object type identifier;
retrieve the generated object page interface template associated with the first user identifier and the selected object type identifier from the object page template repository;
retrieve a subset of object data associated with the object identifier and the generated object page interface template from an object data repository;
dynamically instantiate the generated object page interface template with the retrieved subset of object data by programmatically mapping the subset of object data to one or more particular widget fields in the generated object page interface template, thereby generating an object page interface; and
cause rendering of the object page interface on the visual display of the computing device.

11. The apparatus of claim 1, wherein the object type identifier corresponds to a hardware type, a software type, a server type, a license type, an accessory type, or a network type.

12. The apparatus of claim 1, wherein the object type identifier corresponds to a host type or a client device type.

13. The apparatus of claim 1, wherein the object type identifier corresponds to an employee type.

14. A method for managing an object page configuration interface of an asset management system, the method comprising:
receiving an object page configuration request comprising a selected object type identifier and a first user identifier associated with a first user;
rendering an object page configuration interface to a visual display of a computing device in response to receiving the object page configuration request,
wherein the object page configuration interface comprises a horizontal widget selection interface and wherein the horizontal widget selection interface comprises one or more widget components configured to be rendered in a horizontal arrangement, each horizontal widget component being configurable to define and visually organize a first object data subset to be displayed in correlation to a selected object,
wherein the object page configuration interface comprises a vertical widget selection interface and wherein the vertical widget selection interface comprises one or more widget components configured to be rendered in a vertical arrangement, each vertical widget component being configurable to define and visually organize a second object data subset to be displayed in correlation to a selected object,
wherein the horizontal widget selection interface is distinct and separate from the vertical widget selection interface,
wherein the first object data subset is different than the second object data subset; and
wherein each of the selection interfaces is concurrently displayed to the object page configuration interface;
receiving one or more horizontal widget selection requests in response to user interaction with the horizontal widget selection interface;
receiving one or more vertical widget selection requests in response to user interaction with the vertical widget selection interface;
generating an object page interface template based at least in part on the received widget selection requests, wherein the object page interface template comprises at least one horizontal widget content interface component and at least one vertical widget content interface component, and wherein a dynamic instantiation of the object page interface template generates an object page interface; and
storing the generated object page interface template in association with the first user identifier and the selected object type identifier in an object page template repository.

15. The method of claim 14, wherein the object page template repository comprises a plurality of user-generated object page interface templates, each of the user-generated object page interface templates associated with a user identifier.

16. The method of claim 14, wherein each of the widget selection requests comprises a widget component identifier.

17. The method of claim 16 further comprising:
retrieving one or more widget configuration items based upon at least the received widget component identifiers;
rendering a widget configuration interface to the object page configuration interface based upon the retrieved one or more widget configuration items;
receiving one or more widget configuration item selection requests in response to user interaction with the widget configuration interface; and
generating the object page interface template based at least upon the received widget selection requests and the received widget configuration item selection requests.

18. The method of claim 17, the method further comprising retrieving widget configuration items based upon at least the received widget component identifiers and an object type corresponding to the selected object type identifier.

19. The method of claim 17, wherein each of the one or more horizontal widget selection requests comprises a horizontal orientation identifier and each of the one or more vertical widget selection requests comprises a vertical orientation identifier.

20. The method of claim 19, the method further comprising:
 retrieving subsets of available widget configuration items based upon at least the received widget component identifiers and the associated orientation identifiers, such that a first subset of available widget configuration items corresponding to a first widget component identifier and a horizontal orientation identifier differs from a second subset of available widget configuration items corresponding to the first widget component identifier and a vertical orientation identifier.

21. The method of claim 17, the method further comprising:
 retrieving widget configuration items based upon at least the received widget component identifiers and a user role associated with the first user identifier.

22. The method of claim 16, wherein each of the widget component identifiers corresponds to an attributes widget component, a connected tickets widget component, a comments widget component, an attachments widget component, a references widget component, an object history widget component, or a query widget component.

23. The method of claim 14, the method further comprising:
 receiving an object page display request comprising the first user identifier and an object identifier, wherein the object identifier is associated with the selected object type identifier;
 retrieving the generated object page interface template associated with the first user identifier and the selected object type identifier from the object page template repository;
 retrieving a subset of object data associated with the object identifier and the generated object page interface template from an object data repository;
 dynamically instantiating the generated object page interface template with the retrieved subset of object data by programmatically mapping the subset of object data to one or more particular widget fields in the generated object page interface template, thereby generating an object page interface; and
 rendering the object page interface on the visual display of the computing device.

* * * * *